United States Patent
Takaka et al.

(10) Patent No.: US 9,174,592 B2
(45) Date of Patent: Nov. 3, 2015

(54) POWER LINE COMMUNICATIONS SYSTEM, POWER LINE COMMUNICATION DEVICE, AND CONNECTOR DEVICE

(75) Inventors: Yousuke Takaka, Osaka (JP); Yutaka Komatsu, Osaka (JP); Takeshi Hagihara, Osaka (JP); Hiroya Andoh, Toyota (JP); Yuta Ochiai, Toyota (JP); Nobuyuki Nakagawa, Toyota (JP); Yukihiro Miyashita, Toyota (JP)

(73) Assignees: SUMITOMO ELECTRIC INDUSTRIES, LTD., Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 408 days.

(21) Appl. No.: 13/820,693

(22) PCT Filed: Aug. 24, 2011

(86) PCT No.: PCT/JP2011/069044
§ 371 (c)(1),
(2), (4) Date: Mar. 4, 2013

(87) PCT Pub. No.: WO2012/032932
PCT Pub. Date: Mar. 15, 2012

(65) Prior Publication Data
US 2013/0154362 A1 Jun. 20, 2013

(30) Foreign Application Priority Data

Sep. 10, 2010 (JP) .................................. 2010-203540
Dec. 28, 2010 (JP) .................................. 2010-293185
Jul. 1, 2011 (JP) .................................. 2011-147599

(51) Int. Cl.
*B60R 16/023* (2006.01)
*B60L 11/18* (2006.01)
(Continued)

(52) U.S. Cl.
CPC ............. *B60R 16/023* (2013.01); *B60L 3/0069* (2013.01); *B60L 3/04* (2013.01); *B60L 11/1818* (2013.01);
(Continued)

(58) Field of Classification Search
USPC ......................................................... 307/147
See application file for complete search history.

(56) References Cited

U.S. PATENT DOCUMENTS

2010/0138088 A1   6/2010   Ichikawa et al.

FOREIGN PATENT DOCUMENTS

CN      101678800 A    3/2010
JP      61-136327      6/1986
(Continued)

OTHER PUBLICATIONS

Murakami, K. et al. "Trend of Wire Harness Technology for Electric Vehicles." Institute of Electronics, Information, and Communication Engineers. Feb. 1995. pp. 25-32.
(Continued)

*Primary Examiner* — Robert Deberadinis
(74) *Attorney, Agent, or Firm* — McDermott Will & Emery LLP

(57) ABSTRACT

A coupling transformer 15 necessary for power line communication is provided in a connector device 3. The coupling transformer 15 is formed by winding an AC line 11 and a signal wire 13 around an annular toroidal core 15a, which is to be fitted on a tubular part 32 of the connector device 3. Cutouts for housing the AC line 11 and the signal wire 13 wound around the toroidal core 15a are formed in the tubular part 32 of the connector device 3. Further, a coil 17a is connected to the AC line 11, a capacitor 17b is connected to an AC line 12, and the coil 17a and the capacitor 17b are connected to each other with a wire 17c provided along the AC lines 11 and 12, whereby a filter circuit is formed.

18 Claims, 27 Drawing Sheets

(51) Int. Cl.
*H04B 3/56* (2006.01)
*H01R 13/68* (2011.01)
*B60L 3/00* (2006.01)
*B60L 3/04* (2006.01)
*H02H 9/04* (2006.01)
*H01B 7/30* (2006.01)

(52) U.S. Cl.
CPC ............ *B60L 11/1846* (2013.01); *H01R 13/68* (2013.01); *H02H 9/042* (2013.01); *H04B 3/56* (2013.01); *B60L 2210/30* (2013.01); *B60L 2230/12* (2013.01); *H04B 2203/5483* (2013.01); *H04B 2203/5487* (2013.01); *Y02T 10/7005* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

FOREIGN PATENT DOCUMENTS

| | | |
|---|---|---|
| JP | 1-221929 A | 9/1989 |
| JP | 07-192826 A | 7/1995 |
| JP | 07-240705 A | 9/1995 |
| JP | 2001-231112 A | 8/2001 |
| JP | 2007-214765 A | 8/2007 |
| JP | 2008-035665 A | 2/2008 |
| JP | 2008-072576 A | 3/2008 |
| JP | 2009-194782 A | 8/2009 |
| JP | 2012-002507 A | 1/2012 |
| JP | 2012-002508 | 1/2012 |
| JP | 2012-084273 A | 4/2012 |
| JP | 2012-100253 A | 5/2012 |
| JP | 2012-147120 A | 8/2012 |
| JP | 2012-151825 A | 8/2012 |
| JP | 2012-169143 A | 9/2012 |
| JP | 2012-174661 A | 9/2012 |
| JP | 2012-199903 A | 10/2012 |

OTHER PUBLICATIONS

International Search Report issued in International Patent Application No. PCT/JP2011/069044 dated Oct. 18, 2011.
Chinese Office Action issued in corresponding Chinese Application No. 201180042750.X, dated Apr. 1, 2014, with English translation.
Office Action issued in Japanese Patent Application No. 2011-147599 dated May 28, 2013.
Cyriacus Bleijs, "Low-cost charging systems with full communication capability," EVS24 International Battery, Hybrid and Fuel Cell Electric Vehicle Symposium, May 13, 2009, EVS24—Stavanger, Norway, pp. 1-9.

FIG. 4

ONE EXAMPLE OF FILTER CIRCUIT

|  | HIGH SPEED COMMUNICATION | LOW SPEED COMMUNICATION |
|---|---|---|
| COMMUNICATION SPEED (FREQUENCY) | 2~30MHz | 10~150kHz |
| CAPACITOR CAPACITY | 5~15nF | 0.5~1.5μF |
| COIL INDUCTANCE | 10 μH OR HIGHER | 500 μH OR HIGHER |

POWER LINE COMMUNICATIONS SYSTEM, POWER LINE COMMUNICATION DEVICE, AND CONNECTOR DEVICE

RELATED APPLICATIONS

This application is the U.S. National Phase under 35 U.S.C. §371 of International Application No. PCT/JP2011/069044, filed on Aug. 24, 2011, which in turn claims the benefit of Japanese Application No. 2011-147599, filed on Jul. 1, 2011, Japanese Application No. 2010-293185, filed on Dec. 28, 2010, and Japanese Application No. 2010-203540, filed on Sep. 10, 2010, the disclosures of which Applications are incorporated by reference herein.

TECHNICAL FIELD

The present invention relates to power line communication systems in which a vehicle, such as an electric vehicle or a plug-in hybrid vehicle, whose battery can be charged by external feeding, and an external feeding device perform power line communication with each other via a charging cable, and relates to a power line communication device and a connector device installed in the vehicle to be used in the system.

BACKGROUND ART

In recent years, there are beginning to prevail electric vehicles and hybrid vehicles which include devices such as motors and batteries and which travel by driving the motors, using power accumulated in the batteries. Electric vehicles need to have their batteries to be charged by external feeding devices, and even hybrid vehicles include plug-in hybrid vehicles that allow their batteries to be charged by external feeding devices. In a vehicle whose battery is charged from outside, a plug of a charging cable connected to an external feeding device is coupled to a connector device of a charging port provided in the vehicle, and power is supplied from the feeding device to the battery of the vehicle via the charging cable, whereby the battery is charged.

Patent Literature 1 proposes an electric vehicle charging connector in which a DC power receiving portion and an AC power receiving portion are collectively provided. In the electric vehicle charging connector, the DC power receiving portion and the AC power receiving portion, which are defined from each other, are arranged in a power receiving connector of a single structure, and a first cap for openably closing the entirety of the open end of the power receiving connector, and a second cap for openably closing a through hole formed through a portion of the first cap corresponding to the AC power receiving portion, are provided.

On the other hand, in the case of charging a battery of a vehicle by a feeding device, a communication function is required that allows transmission and reception of information for controlling the charge and information for managing the amount of charge, accounting, etc. between the vehicle and the feeding device.

Patent Literature 2 proposes a power system in which a plurality of electric vehicles and a supply management unit perform power line communication with each other, and in which the plurality of electric vehicles each configured to be able to supply AC power can supply AC power to a common power consuming unit. In this power system, each of the plurality of vehicles having received a supply start instruction through power line communication transmits an identifier to other vehicles, one of the vehicles is determined as a master, and notification that the vehicle is the master is transmitted to other vehicles. The master vehicle generates an AC voltage in accordance with its own period, and other vehicles each generate an AC voltage synchronized with that of the master vehicle, whereby the plurality of vehicles start supplying power to a power load in a cooperative manner.

CITATION LIST

Patent Literature

[PTL 1] Japanese Laid-Open Patent Publication No. H7-192826
[PTL 2] Japanese Laid-Open Patent Publication No. 2008-035665

SUMMARY OF THE INVENTION

Problems to be Solved by the Invention

However, as in the power system described in Patent Literature 2, in order for a vehicle and an external device to perform power line communication, it is necessary to install on the vehicle a power line communication device (on-vehicle PLC (Power Line Communication) device) in which a component such as a coupling transformer for superposing signals on a power line and for extracting signals superposed on the power line is mounted on a circuit board. Since downsizing of a component such as a coupling transformer is restricted to some degree, (the circuit board for) the on-vehicle PLC device tends to be large. Since a large number of electronic apparatuses are installed in a vehicle such as an electric vehicle and thus space for arranging apparatuses in the vehicle is limited, downsizing of the on-vehicle PLC device is desired.

The present invention has been made in view of the above situations. An object of the present invention is to provide a power line communication system, a power line communication device, and a connector device that enable downsizing, in a vehicle having a function of power line communication with a feeding device via a charging cable, of a device for realizing the power line communication.

Solution to the Problems

A power line communication system according to the present invention is a power line communication system in which a vehicle and a feeding device are connected to each other with a charging cable, and power line communication is performed between a power line communication device installed in the vehicle and the feeding device via the charging cable, the charging cable including two power supply wires, the power line communication device including: two internal power supply wires respectively connected to the power supply wires of the charging cable; a filter circuit connected to and between the two internal power supply wires; and an electromagnetic guidance type signal converter including a primary coil provided in one or both of the internal power supply wires, and a secondary coil electromagnetically connected to the primary coil, and the feeding device including: two internal power supply wires respectively connected to the power supply wires of the charging cable; a filter circuit connected to and between the two internal power supply wires; and an electromagnetic guidance type signal converter including a primary coil provided in one or both of the internal power supply wires, and a secondary coil electromagnetically connected to the primary coil, wherein a current loop circuit is formed by the two internal power supply wires and the filter circuit of the power line communication device, the two power supply wires of the charging cable, and the two internal power supply wires and the filter circuit of the feeding device, and each of the power line communication device and the feeding device is configured to superpose a signal on the charging cable and extract a signal superposed on the charging cable by means of its signal converter.

Further, in the power line communication system according to the present invention, the power line communication device includes a connector device which is installed in the vehicle and to which the charging cable is connected, the connector device includes: a plurality of connection terminals for connecting the connector device to the charging cable; a connector body which houses the plurality of connection terminals; a plurality of internal wires including the two internal power supply wires and connected to the connection terminals; a tubular part which is provided in the connector body and through which the plurality of internal wires are inserted; an annular magnetic body provided externally around the tubular part; and a signal wire wound around the annular magnetic body, one or both of the internal power supply wires are wound around the annular magnetic body, and the electromagnetic guidance type signal converter of the power line communication device is formed by the annular magnetic body, the one or both of the internal power supply wires, and the signal wire.

Further, in the power line communication system according to the present invention, the signal wire and the one or both of the internal power supply wires are wound around the annular magnetic body so as to overlap each other.

Further, a power line communication device according to the present invention is a power line communication device in a vehicle which performs power line communication with an external device which is connected to the vehicle with a charging cable, the charging cable including two power supply wires, the power line communication device including: two internal power supply wires respectively connected to the power supply wires of the charging cable; a filter circuit connected to and between the two internal power supply wires; and an electromagnetic guidance type signal converter including a primary coil provided in one or both of the internal power supply wires, and a secondary coil electromagnetically connected to the primary coil, wherein superposition of a signal on the charging cable and extraction of a signal superposed on the charging cable are performed by means of the signal converter.

Further, the power line communication device according to the present invention includes a connector device which is installed in the vehicle and to which the charging cable is connected, wherein the connector device includes: a plurality of connection terminals for connecting the connector device to the charging cable; a connector body which houses the plurality of connection terminals; a plurality of internal wires including the two internal power supply wires and connected to the connection terminals; a tubular part which is provided in the connector body and through which the plurality of internal wires are inserted; an annular magnetic body provided externally around the tubular part; and a signal wire wound around the annular magnetic body, one or both of the internal power supply wires are wound around the annular magnetic body, and the signal converter is formed by the annular magnetic body, the one or both of the internal power supply wires, and the signal wire.

Further, in the power line communication device according to the present invention, the signal wire and the one or both of the internal power supply wires are wound around the annular magnetic body so as to overlap each other.

Further, A connector device according to the present invention is a connector device which is used in the power line communication system described above and which includes a plurality of connection terminals, a connector body which houses the plurality of connection terminals, and a plurality of internal wires including two internal power supply wires and connected to the connection terminals, the connector device including: a tubular part which is provided in the connector body and through which the plurality of internal wires are inserted; an annular magnetic body provided externally around the tubular part; and a signal wire wound around the annular magnetic body, wherein one or both of the internal power supply wires are wound around the annular magnetic body, and an electromagnetic guidance type signal converter for power line communication is formed by the annular magnetic body, the one or both of the internal power supply wires, and the signal wire.

Further, in the connector device according to the present invention, the signal wire and the one or both of the internal power supply wires are wound around the annular magnetic body so as to overlap each other.

Further, in the connector device according to the present invention, the annular magnetic body is externally fitted on the tubular part, and a cutout for housing the wound portion of the one or both of the internal power supply wires around the annular magnetic body is formed in the tubular part.

Further, in the connector device according to the present invention, the cutout is formed so as to house the signal wire wound around the annular magnetic body as well as the wound portion of the one or both of the internal power supply wires around the annular magnetic body.

Further, a connector device according to the present invention is a connector device which includes a plurality of connection terminals, a connector body which houses the plurality of connection terminals, and a plurality of internal wires including two internal power supply wires and connected to the connection terminals, the connector device including: an annular magnetic body through which one of the internal power supply wires is inserted and the other of the internal power supply wires is not inserted; and a signal wire wound around the annular magnetic body, wherein an electromagnetic guidance type signal converter for power line communication is formed by the annular magnetic body, the one of the internal power supply wires, and the signal wire.

Further, the connector device according to the present invention further includes a filter circuit connected to and between the two internal power supply wires.

Further, in the connector device according to the present invention, the filter circuit is formed by a plurality of electronic components, and the plurality of electronic components are connected to each other with a wire provided along the internal power supply wires.

Further, the connector device according to the present invention further includes a surge protection element connected to and between the two internal power supply wires.

Further, the connector device according to the present invention further includes a fuse provided in the internal power supply wires.

In the present invention, by connecting a charging cable including two power supply wires (two AC (Alternating Current) lines (i.e., two wires other than a grounding wire) for single-phase three-wire AC feeding) to a power line communication device installed in a vehicle and a feeding device, the devices perform power line communication via the charging cable. The power line communication device and the feeding device each include a filter circuit connected to and between two internal power supply wires which are connected to the power supply wires of the charging cable, and an electromagnetic guidance type signal converter provided in one or both of the internal power supply wires.

In a case where each of the signal converter of the power line communication device and the signal converter of the feeding device is provided in one of their internal power supply wires, they are respectively provided in corresponding internal power supply wires connected to one (common) of the power supply wires of the charging cable. Each filter circuit can be formed by a coil and/or a capacitor, or the like. Each signal converter can be formed by winding one or both of the internal power supply wires around a magnetic body core as a primary coil, and by winding a signal wire, which is connected to a power line communication circuit or the like, around the core as a secondary coil.

According to this configuration, in a case where the vehicle and the feeding device are connected to each other with the charging cable, a closed current loop circuit is formed by: the two internal power supply wires and the filter circuit of the power line communication device; the two power supply wires of the charging cable; and the two internal power supply wires and the filter circuit of the feeding device. Each of the power line communication device of the vehicle and the feeding device can superpose a signal on the charging cable (one or both of the internal power supply wires and corresponding power supply wire(s)) and extract a signal superposed on the charging cable, by using its own signal converter, thereby being able to perform power line communication.

In power line communication schemes, it is general that a signal converter is connected to and between two internal power supply wires, to superpose and extract signals. However, such a configuration requires provision of a large choke coil, and the like, which may result in a larger power line communication device. In contrast, the configuration of the present invention does not require provision of a choke coil and the like. Note that, in the configuration of the present invention, the magnetic body being a core for the signal converter may become large compared with that in a general configuration in which a signal converter is connected to and between internal power supply wires. However, the core for the signal converter can be provided integrally with the connector device for providing connection to the charging cable, as described below.

In the present invention, a signal converter for power line communication is provided in a connector device to which a charging cable is connected, thereby realizing downsizing of a power line communication device (downsizing of the entire device for power line communication, including a connector device, provided in a vehicle).

In the connector device, a connector body, which houses a plurality of connection terminals for connecting the connector device to the charging cable, is provided with a tubular part through which a plurality of internal wires connected to the connection terminals are inserted. Further, an annular magnetic body being a core for the signal converter is arranged externally around the tubular part. The plurality of internal wires inserted through the tubular part include two internal power supply wires. The annular magnetic body has one or both of the internal power supply wires wound therearound, and a signal wire for transferring signals for power line communication wound therearound. The one or both of the internal power supply wires and the signal wire wound around the annular magnetic body serve as a primary coil and a secondary coil, respectively, whereby an electromagnetic guidance type signal converter is formed.

Accordingly, it is not necessary to provide a large signal converter on, for example, a circuit board of the power line communication device, and thus, the power line communication device can be downsized. Moreover, it is possible to integrate the power line communication device and another device (such as body ECU (Electronic Control Unit)) within the vehicle, by using a CPU (Central Processing Unit) in common.

Further, in the present invention, an internal power supply wire serving as the primary coil and the signal wire serving as the secondary coil are wound around the annular magnetic body so as to overlap each other. For example, the signal wire is firstly wound around the annular magnetic body, and then the internal power supply wire is wound over the signal wire (the winding order may be in the reverse). Accordingly, leak magnetic flux is reduced and communication characteristics of power line communication are improved.

Further, in the present invention, a cutout for housing the wound portion of one or both of the internal power supply wires around the annular magnetic body is formed in the tubular part of the connector device. Accordingly, the annular magnetic body can be externally fitted on the tubular part of the connector device, with the internal power supply wire(s) wound around the annular magnetic body, and thus, assembly and the like of the connector device can be facilitated.

Further, in the present invention, a cutout is formed so as to house the wound portion of the signal wire around the annular magnetic body as well as the wound portion of an internal power supply wire. Accordingly, the internal power supply wire and the signal wire wound around the annular magnetic body can be housed in the cutout, and thus, assembly and the like of the connector device can be facilitated. In particular, in the case of a configuration in which the internal power supply wire and the signal wire are wound around the annular magnetic body so as to overlap each other, these wound portions are housed in one cutout, whereby the connector device can be downsized.

Further, in the present invention, without providing the annular magnetic body externally around the tubular part of the connector device, one of the internal power supply wires is inserted through the annular magnetic body. In this configuration, the other internal power supply wire is not inserted through the annular magnetic body, and the signal wire is wound around the annular magnetic body. Note that the one of the power supply wires may be wound around the annular magnetic body, or may be simply inserted through the annular magnetic body, without being wound therearound.

Further, in the present invention, a filter circuit is connected to and between the two internal power supply wires. By directly connecting the filter circuit to the two internal power supply wires, not to a circuit board or the like of the power line communication device, the power line communication device can be further downsized.

In a case where a device of the vehicle such as a charger or a converter, to which the two internal power supply wires are connected, includes a coil, a capacitor, or the like corresponding to that of the filter circuit that should be connected to and between the internal power supply wires, such a coil, capacitor, or the like may be used as the filter circuit.

Further, in the present invention, in a case where the filter circuit connected to and between the two internal power supply wires is formed by a plurality of electronic components such as a coil and a capacitor, the plurality of electronic components need to be connected by using a wire. In this case, the plurality of electronic devices are connected with a wire provided along the internal power supply wires to which the electronic components are connected. Accordingly, when installing the internal power supply wires in the vehicle, it is possible to install the wire connecting the electronic components, along the internal power supply wires.

Further, in the present invention, a surge protection element is connected to and between the two internal power supply wires. As the protection element, a varistor can be used for example. By providing the protection element in the connector device provided at a charging port of the vehicle, even in a case where a lightning strike has occurred while charging the vehicle and an excessive voltage has been applied to the charging system of the vehicle due to a lightning surge, devices in the vehicle provided further in than the connector device can be protected from the surge.

In a case where the protection element is connected to the internal power supply wires, between the connection terminal and the wound portion, it is possible to prevent, at a further out position, the surge from entering the vehicle.

In a case where the protection element is connected to the internal power supply wires, between the wound portion and an internal device of the vehicle such as a charger, the protection element does not get in the way when arranging the annular magnetic body externally around the tubular part. Therefore, it is possible to realize, for example, facilitation of assembly of the connector device having the protection element.

Further, in the present invention, a fuse is provided in an internal power supply wire. The fuse may be provided in either of the two internal power supply wires. In the case where the protection element is connected to the connector device as described above, it is preferable that the fuse is provided at a further out position in the vehicle than the protection element (between the connection terminal and the protection element). Even in a case where an excessive current has flown in from outside while charging the vehicle, since the fuse breaks the internal power supply wire, it is possible to prevent an excessive current from flowing further in the power receiving system.

Advantageous Effects of the Invention

According to the present invention, by connecting a vehicle and a feeding device to each other with a charging cable, a current loop circuit is formed by two paths for supplying power and two filter circuits connected to and between the paths, and in each of the vehicle and the feeding device, an electromagnetic guidance type signal converter is provided in one or both of internal power supply wires, whereby superposition and extraction of signals are performed. Accordingly, it is not necessary to provide a choke coil, which is necessary for a power line communication configuration in which a signal converter is connected to and between internal power supply wires, and thus, the present invention can contribute to downsizing of a power line communication device.

According to the present invention, a signal converter for power line communication is provided in a connector device to which a charging cable is connected. For example, since two internal power supply wires are inserted through a tubular part provided in a connector, and one or both of the internal power supply wires and a signal wire for transferring signals for power line communication are wound around an annular magnetic body provided externally around the tubular part, an electromagnetic guidance type signal converter is formed by the annular magnetic body, the one or both of the power supply wires, and the signal wire. Therefore, it is not necessary to provide a signal converter on a circuit board or the like of the power line communication device, and thus, downsizing of the power line communication device can be realized.

BRIEF DESCRIPTION OF THE DRAWINGS

FIG. 4 is a diagram showing one example of a filter circuit shown in FIG. 3.

DESCRIPTION OF EMBODIMENTS

Embodiment 1

Figure 1:
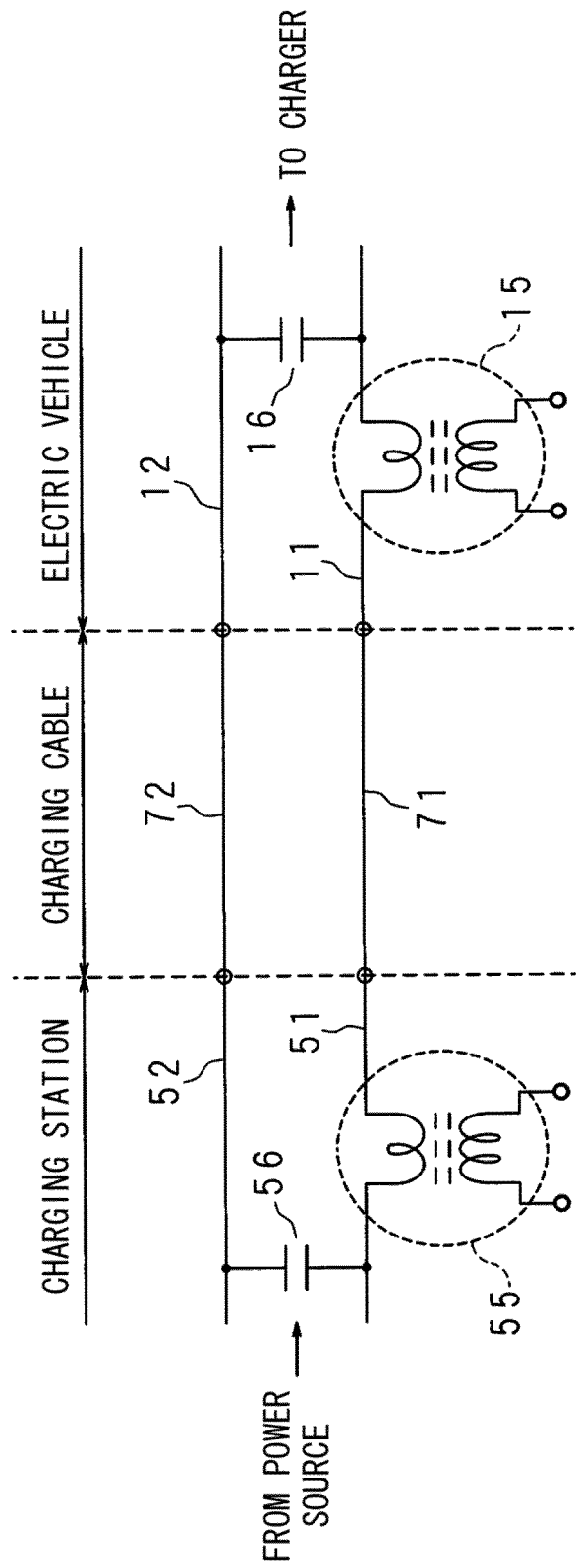
FIG. 1 is a schematic diagram for explaining a configuration of a power line communication system according to the present invention.

Hereinafter, the present invention will be described specifically, based on the drawings illustrating embodiments thereof. FIG. 1 is a schematic diagram for explaining a configuration of a power line communication system according to the present invention. In the present embodiment, description will be given of an example of a configuration in which when a charging station (feeding device) is connected to an electric vehicle (vehicle) via a charging cable in order to charge a battery of the electric vehicle, information such as charge control, user authentication, or accounting management is transmitted and received between the charging station and the electric vehicle, through power line communication using the charging cable.

The charging cable which connects the electric vehicle to the charging station includes: two power supply wires (hereinafter, simply referred to as AC lines) 71 and 72 to which an AC voltage is applied; and a grounding wire (not shown in FIG. 1) connected to a ground potential. In the present embodiment, a three-wire AC voltage using the two AC lines and the one grounding wire is supplied from the charging station to the electric vehicle.

The charging station includes two internal power supply wires (hereinafter, simply referred to as AC lines) 51 and 52 which are connected to the AC lines 71 and 72 of the charging cable and to which an AC voltage is applied from a power source. In the charging station, a capacitor 56 is connected to and between the two AC lines 51 and 52. In the one AC line 51, a coupling transformer (electromagnetic guidance type signal converter) 55 is provided between the connection point to the charging cable and the connection point to the capacitor 56. The capacitor 56 between the AC lines 51 and 52 forms a band pass filter circuit. With respect to the coupling transformer 55, the primary side thereof is connected to the AC line 51, and the secondary side thereof is connected to a power line communication section (not shown) in the charging station.

Similarly, the electric vehicle includes two internal power supply wires (hereinafter, simply referred to as AC lines) 11 and 12 which are connected to the AC lines 71 and 72 of the charging cable and which guide the power from the charging station and the charging cable to a charger in the vehicle. Further, in the electric vehicle, a capacitor 16 is connected to and between the two AC lines 11 and 12, and in the one AC line 11, a coupling transformer 15 is provided between the connection point to the charging cable and the connection point to the capacitor 16. Although the capacitor 16 between the AC lines 11 and 12 forms a band pass filter circuit, in a case where a similar capacitor is installed in the charger, this capacitor may be used in common With respect to the coupling transformer 15, the primary side thereof is connected to the AC line 11, and the secondary side thereof is connected to a power line communication section (not shown in FIG. 1) in the electric vehicle.

By connecting the charging station and the electric vehicle to each other with the charging cable, two power supply paths are formed: an energizing path in which the AC line 51 of the charging station, the AC line 71 of the charging cable, and the AC line 11 of the electric vehicle are connected; and an energizing path in which the AC line 52 of the charging station, the AC line 72 of the charging cable, and the AC line 12 of the electric vehicle are connected. At this time, it is preferable that connection positions in the charging cable are determined such that the AC line 11 of the electric vehicle provided with the coupling transformer 15 and the AC line 51 of the charging station provided with the coupling transformer 55 are connected to each other via the same AC line 71 of the charging cable. In a state where the charging station and the electric vehicle are connected with the charging cable, a closed current loop circuit is formed by the two power supply paths and the capacitors 16 and 56. Accordingly, by means of the coupling transformers 15 and 55 arranged in this loop, it is possible to superpose signals on the AC lines 11, 51, and 71 and to extract signals superposed on the AC lines 11, 51, and 71, and thus, it is possible to perform power line communication between the charging station and the electric vehicle.

Figure 2:
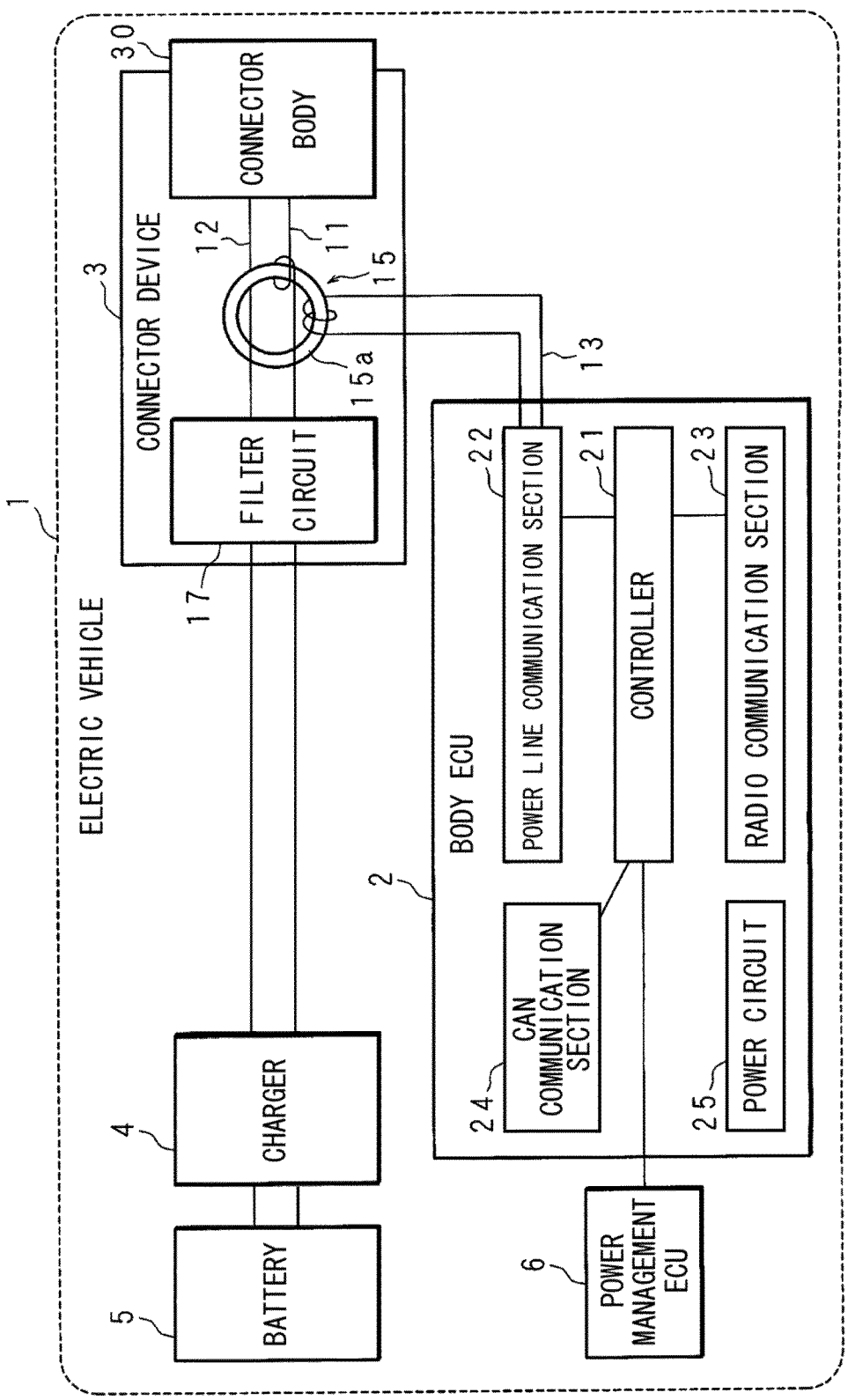
FIG. 2 is a block diagram showing an internal configuration of an electric vehicle corresponding to a power line communication system according to the present invention.

FIG. 2 is a block diagram showing an internal configuration of an electric vehicle corresponding to the power line communication system according to the present invention, and shows blocks relating to charging of and communication for the electric vehicle. In an electric vehicle 1 according to the present embodiment, a body ECU 2, a connector device 3, a charger 4, a battery 5, a power management ECU 6, and the like are installed. In the electric vehicle 1 according to the present embodiment, the coupling transformer 15 necessary for performing power line communication is provided in the connector device 3, and a power line communication section 22 which processes information and signals transmitted and received through power line communication is provided in the body ECU 2, whereby functions for performing power line communication are distributed and integrated between the body ECU 2 and the connector device 3. That is, a power line communication device according to the present embodiment is formed by the power line communication section 22 in the body ECU 2 and the coupling transformer 15 in the connector device 3.

The body ECU 2 performs control for locking/unlocking doors, lighting headlights, and the like for the electric vehicle 1, and includes a controller 21, the power line communication section 22, a radio communication section 23, a CAN (Controller Area Network) communication section 24, a power circuit 25, and the like. Specifically, the controller 21 is implemented by a processor such as a CPU (Central Processing Unit) or an MPU (Micro Processing Unit), and performs control of operations of sections in the body ECU 2, various types of arithmetic processing, and the like. In particular, in the present embodiment, the controller 21 is configured to be able to transmit and receive data to and from the power management ECU 6 of the electric vehicle 1. The controller 21 provides transmission data provided by the power management ECU 6, to the power line communication section 22, thereby performing data transmission through power line communication. The controller 21 also provides reception data that the power line communication section 22 received through power line communication, to the power management ECU 6.

The power line communication section 22 is connected via a signal wire 13 to the coupling transformer 15 provided in the connector device 3 (note that the signal wire 13 forms a secondary coil by being wound around a toroidal core 15a of the coupling transformer 15, and is also a part of the coupling transformer 15). The power line communication section 22 outputs a signal corresponding to transmission data provided by the controller 21 to the signal wire 13, to superpose the signal on the AC line 11 by means of the coupling transformer 15, thereby performing data transmission to the charging station via the charging cable. Further, the power line communication section 22 obtains a signal on the signal wire 13 to extract a signal from the charging station superposed on the AC line 11, and provides reception data corresponding to this signal to the controller 21.

The radio communication section 23 performs radio communication with communications apparatuses, such as a mobile phone of a user, inside or outside the vehicle. The CAN communication section 24 performs wired communication with other devices installed in the electric vehicle 1. Each of the radio communication section 23 and the CAN communication section 24 transmits data provided by the controller 21 and provides received data to the controller 21. The power circuit 25 supplies power supplied from the battery 5 of the electric vehicle 1 (or another battery) to sections in the body ECU 2, after performing adjustment of the voltage value, and the like.

The connector device 3 connects the charging cable to the electric vehicle 1, and includes a connector body 30 provided with a plurality of connection terminals, and the coupling transformer 15 and a filter circuit 17 for power line communication. The AC lines 11 and 12 are connected to two connection terminals provided in the connector body 30, and the AC lines 11 and 12 are connected to the charger 4 of the electric vehicle 1 via the filter circuit 17. As shown in FIG. 1, for example, the filter circuit 17 is realized by the capacitor 16 connected to and between the AC lines 11 and 12.

The coupling transformer 15 provided in the connector device 3 is formed by winding the one AC line 11 and the signal wire 13 around the toroidal core 15a which is an annular magnetic body. The other AC line 12 is inserted through the toroidal core 15a. A detailed configuration of the connector device 3 will be described later.

The charger 4 charges the battery 5 with the power supplied by the charging station. The charging station supplies power using an AC voltage, for example, whose voltage value is 200V and whose frequency is 50 Hz or 60 Hz. Therefore, the charger 4 performs the charge by converting the AC voltage into a DC voltage and applying the DC voltage to the battery 5. The battery 5 accumulates power for driving a motor (not shown) that causes the electric vehicle to travel, and is a lithium-ion battery, for example. The power management ECU 6 performs control relating to charging of the electric vehicle. The power management ECU 6 performs charge control, by obtaining information from the charging station (such as the voltage value, frequency, or accounting information of the supplied power) which was obtained through power line communication via the power line communication section 22 in the body ECU 2, and by controlling operations of the charger 4 and the like based on the obtained information.

Figure 3:
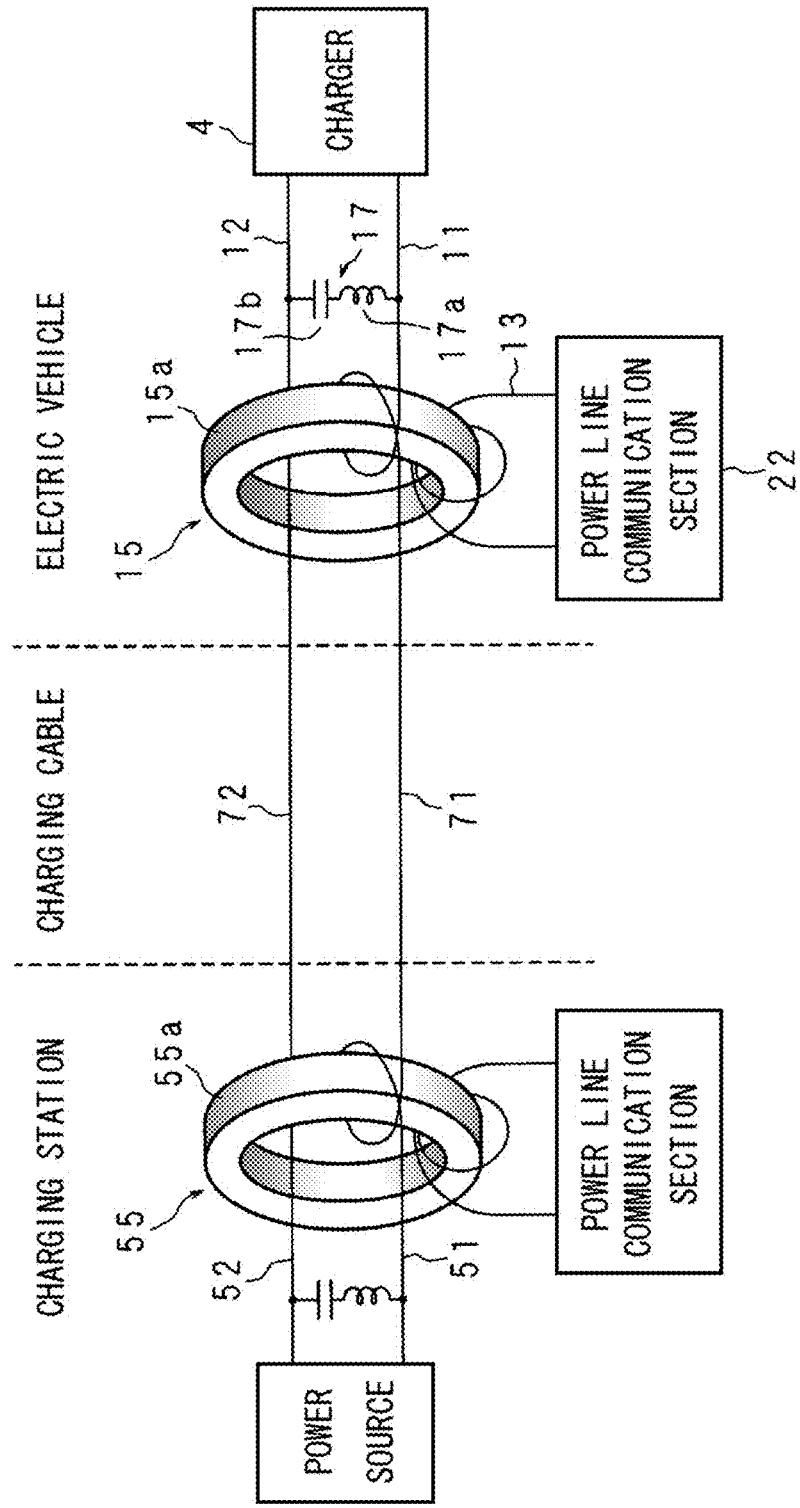
FIG. 3 is a schematic diagram for explaining a configuration of a power line communication system according to embodiment 1.

FIG. 3 is a schematic diagram for explaining a configuration of a power line communication system according to embodiment 1. The configuration of the power line communication system shown in FIG. 3 is substantially equivalent to that of the power line communication system shown in FIG. 1, and is specific configurations of the coupling transformers 15 and 55 which use the toroidal cores 15a and 55a. Since the coupling transformer 15 of the electric vehicle 1 has substantially the same configuration as that of the coupling transformer 55 of the charging station, the configuration of the coupling transformer 15 of the electric vehicle 1 will be described in the following, and description of the coupling transformer 55 of the charging station will be omitted.

The coupling transformer 15 provided for power line communication in the connector device 3 of the electric vehicle 1 is formed by using the toroidal core 15a which is an annular magnetic body. The coupling transformer 15 is configured such that the one AC line 11 is wound (at least once) around the toroidal core 15a, the other AC line 12 is inserted through the toroidal core 15a, and the signal wire 13 connected to the power line communication section 22 is wound (at least once) around the toroidal core 15a. In this configuration, the AC line 11 wound around the toroidal core 15a and the AC line 12 inserted through the toroidal core 15a serve as a primary coil, and the signal wire 13 wound around the toroidal core 15a serves as a secondary coil, whereby they function as the coupling transformer 15.

Further, in the example shown in FIG. 3, the filter circuit 17 connected to and between the AC lines 11 and 12 is formed by a coil 17a and a capacitor 17b which are connected to each other in series. To be more specific, the filter circuit 17 is configured such that one end of the coil 17a is connected to the one AC line 11, one end of the capacitor 17b is connected to the other end of the coil 17a, and the other end of the capacitor 17b is connected to the other AC line 12. Note that the configuration of the filter circuit 17 is not limited to the one shown in FIG. 3. In consideration of the communication speed of the power line communication, the resistance value and capacity value, etc., of the communication path, or characteristics of the toroidal core 15a, etc., the filter circuit 17 may be configured to have a circuit configuration that would suit them.

FIG. 4 is a diagram showing one example of the filter circuit 17 shown in FIG. 3, and shows a specific example of circuit constants for the coil 17a and the capacitor 17b included in the filter circuit 17. For example, in a case where power line communication is performed at a high speed, e.g., at a frequency between 2 and 30 MHz, the inductance of the coil 17a of the filter circuit 17 is preferably 10 µH or higher, and the capacity of the capacitor 17b is preferably about 5 to 15 nF. Further, for example, in a case where power line communication is performed at a low speed, e.g., at a frequency between 10 and 150 kHz, the inductance of the coil 17a of the filter circuit 17 is preferably 500 µH or higher, and the capacity of the capacitor 17b is preferably about 0.5 to 1.5 µF.

Figure 5:
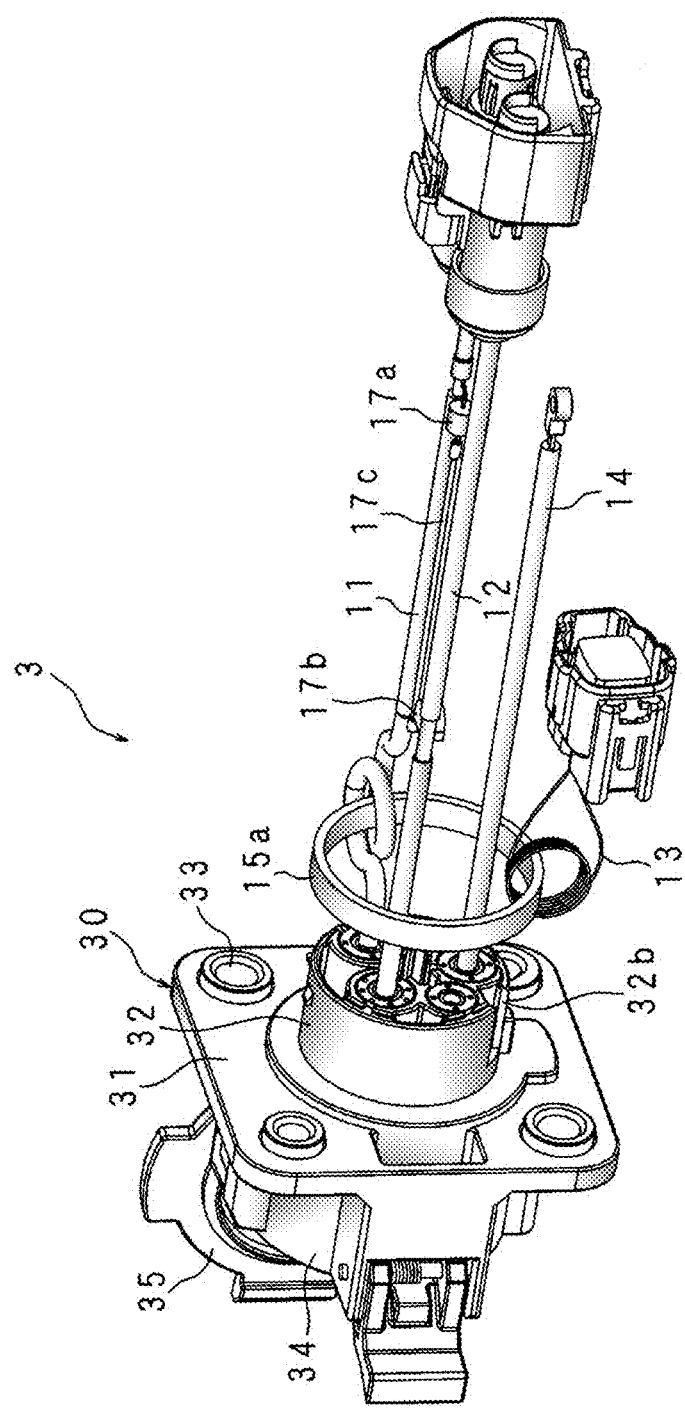
FIG. 5 is an external perspective view showing a configuration of a connector device according to embodiment 1.
Figure 6:
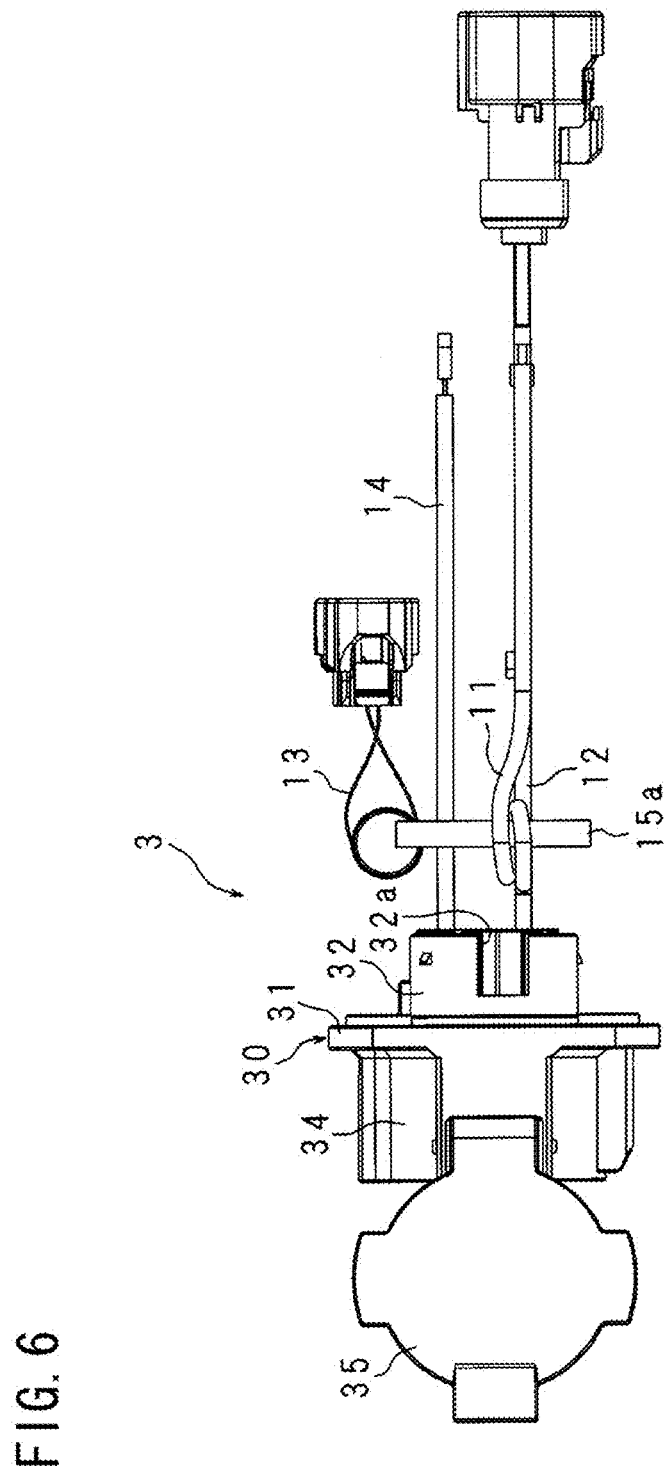
FIG. 6 is a side view showing the configuration of the connector device according to embodiment 1.
Figure 7:
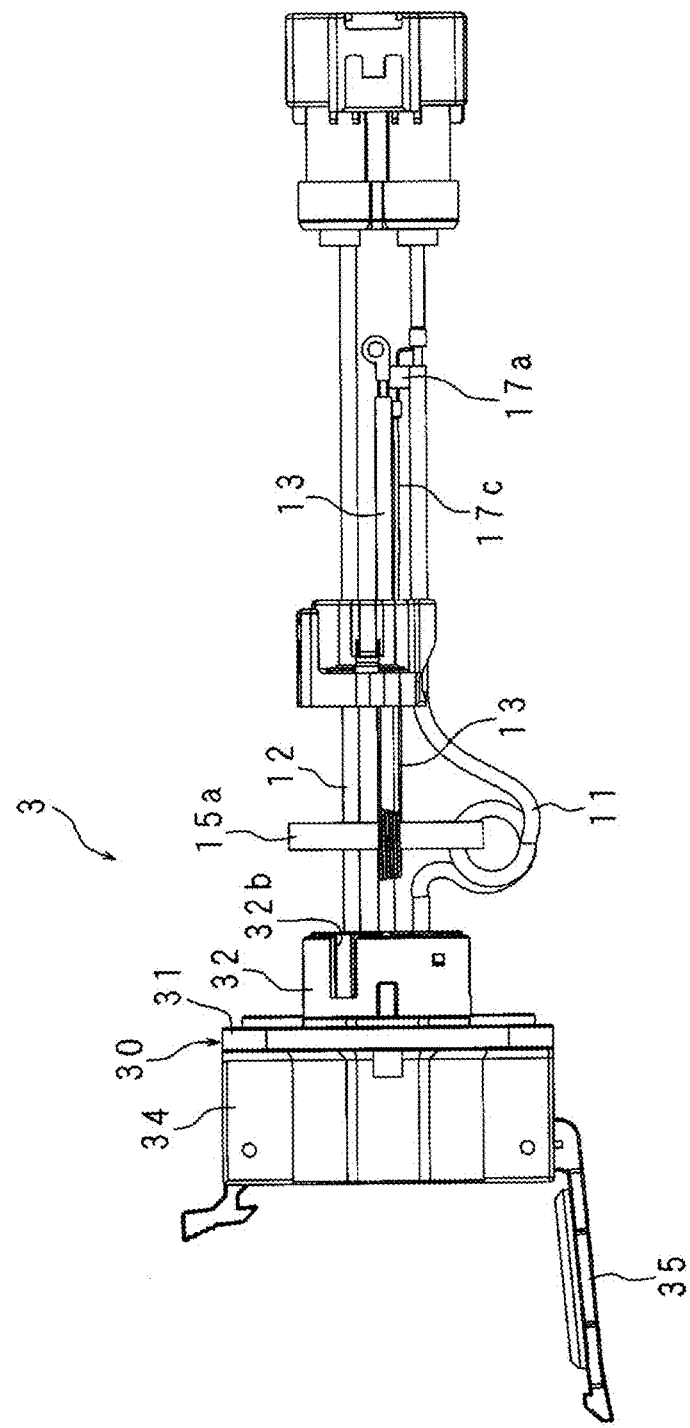
FIG. 7 is a side view showing the configuration of the connector device according to embodiment 1.

FIG. 5 is an external perspective view showing a configuration of the connector device 3 according to embodiment 1, and shows an external view of a portion of the connector device 3 that should be positioned inside the electric vehicle 1 when it is installed in the electric vehicle 1, with some components expressed in an exploded manner. Each of FIG. 6 and FIG. 7 is a side view showing the configuration of the connector device 3 according to embodiment 1. FIG. 6 shows the configuration of the connector device 3 viewed from the depth direction in FIG. 5. FIG. 7 shows the configuration of the connector device 3 viewed from below in FIG. 5.

The connector device 3 includes the connector body 30 which houses a plurality of connection terminals (not shown) to which the two AC lines 11 and 12 and one grounding wire 14 are connected. The connector body 30 includes an attachment part 31 having a substantially-rectangular and plate-like shape, and a cylindrical tubular part 32 provided at the center of a face of the attachment part 31 so as to project therefrom. A mounting hole 33 is formed at each of four corners of the attachment part 31, and the connector body 30 can be mounted at a predetermined position of the body of the electric vehicle 1 by means of screws or the like. Note that the connector body 30 is mounted such that the side on which the tubular part 32 is provided is arranged inside the body.

A cable connection part 34, which has a cylindrical shape and to which a charging cable is connected by being inserted therein at the time of charging, is provided on the other face of the attachment part 31 of the connector body 30. The cable connection part 34 houses a plurality of connection terminals to which the AC lines 11 and 12 and the grounding wire 14 are connected, and provides electrical connection to the charging cable. Further, in the cable connection part 34, a cover 35 is openably provided so as to close the opening portion of the cable connection part 34, in order to prevent the connection terminals from being exposed when the charging cable is not connected thereto.

The AC lines 11 and 12 and the grounding wire 14, which are connected to the plurality of connection terminals housed in the cable connection part 34, are provided in such a manner as to pass through the attachment part 31 of the connector body 30 to be inserted through the tubular part 32. The one AC line 11, which is inserted through the tubular part 32 to be led to an inner portion of the electric vehicle 1, is wound around the toroidal core 15a which is an annular magnetic body. The other AC line 12 and the grounding wire 14 are not wound around the toroidal core 15a, but are inserted through the toroidal core 15a to be led to an inner portion of the electric vehicle 1. Further, the signal wire 13, which is connected to the power line communication section 22 of the body ECU 2, is wound around the toroidal core 15a.

The toroidal core 15a for forming the coupling transformer 15 is configured to be externally fitted on the tubular part 32 of the connector body 30. After the AC line 11 and the signal wire 13 are wound around the toroidal core 15a, the toroidal core 15a is fitted on the tubular part 32, whereby the connector device 3 is assembled.

The tubular part 32 is provided with two cutouts 32a and 32b formed for respectively housing the AC line 11 and the signal wire 13 wound around the toroidal core 15a when the toroidal core 15a is fitted on the tubular part 32. Each of the cutouts 32a and 32b is cut out along the axis direction of the tubular part 32 to reach the edge of the tubular part 32, into a substantially rectangular shape.

Each of the AC lines 11 and 12 and the grounding wire 14 is a conductive wire covered with an insulator. One terminal of the coil 17a is connected to the one AC line 11 by a method such as soldering or welding, at an appropriate position from where the AC line 11 is wound around the toroidal core 15a to the charger 4, in an exposed portion of the conductive wire from which some of the insulator has been removed. Similarly, one terminal of the capacitor 17b is connected to the other AC line 12 by a method such as soldering or welding, at an appropriate position from where the AC line 12 extends from the tubular part 32 to the charger 4, in an exposed portion of the conductive wire from which some of the insulator has been removed. The other terminal of the coil 17a and the other terminal of the capacitor 17b are connected to each other with a wire 17c arranged along the AC lines 11 and 12. Accordingly, the filter circuit 17 connected to and between the AC lines 11 and 12 is formed.

The two AC lines 11 and 12 are arranged in parallel up to the charger 4 in the electric vehicle 1. The connection position of the coil 17a and the connection position of the capacitor 17b are separated from each other by an appropriate distance in the lengthwise direction of the AC lines 11 and 12, and the coil 17a and the capacitor 17b are connected to each other with the wire 17c having a length substantially equal to this distance. This facilitates arranging the AC lines 11 and 12 and the wire 17c in parallel with each other in the electric vehicle 1, and also facilitates arranging these wires, bound and bent at an appropriate position.

According to the power line communication system having the above configuration, the coupling transformer 15 necessary for power line communication is provided in the connector device 3, and the power line communication section 22, which performs processing relating to power line communication by inputting and outputting signals to and from the coupling transformer 15, is provided in the body ECU 2. Accordingly, it is possible to save space for arranging the power line communication device in the electric vehicle 1. The coupling transformer 15 is configured such that the AC line 11 and the signal wire 13 are wound around the annular toroidal core 15a which is to be fitted on the tubular part 32 of the connector device 3. Accordingly, compared with a conventional connector device without the coupling transformer 15, it is possible to provide the coupling transformer 15 in the connector device 3 while suppressing, to as great extent as possible, the device from becoming large. Moreover, since a large toroidal core 15a can be provided in the connector device 3, it is possible to improve communication accuracy of power line communication using the coupling transformer 15 having the toroidal core 15a.

Further, the two power supply paths (the path formed by the AC lines 11, 71, and 51 and the path formed by the AC lines 12, 72, and 52) are formed by connecting the electric vehicle 1 and the charging station to each other with the charging cable, and in each of the electric vehicle 1 and the charging station, the filter circuit is connected to and between the two paths, whereby a closed current loop circuit is formed by the two power supply paths and the two filter circuits. Accordingly, the electric vehicle 1 and the charging station can perform power line communication with each other, by using the coupling transformers 15 and 55 which are provided in one of the paths. Not by connecting the coupling transformer to and between the two AC lines 11 and 12 to perform power line communication, but by providing the coupling transformer 17 in the one AC line 11 to perform power line communication, it is not necessary to connect a large choke coil and the like to the AC lines 11 and 12 in the electric vehicle 1, and thus, it is possible to downsize the device.

Further, since the cutouts 32a and 32b for housing the AC line 11 and the signal wire 13 wound around the toroidal core 15a are formed in the tubular part 32 of the connector device 3, the toroidal core 15a around which the AC line 11 and the signal wire 13 are wound can be easily fitted on the tubular part 32. Accordingly, assembly of the connector device 3 can be facilitated.

Further, the filter circuit 17 is configured such that the coil 17a is connected to the AC line 11, the capacitor 17b is connected to the AC line 12, and the coil 17a and the capacitor 17b are connected to each other with the wire 17c provided along the AC lines 11 and 12. Accordingly, the filter circuit 17 need not be installed on a circuit board of a device such as the body ECU 2 or the power line communication device, and thus, the device can be downsized. Further, when installing the AC lines 11 and 12 in the electric vehicle 1, it is possible to easily install the wire 17c which connects the coil 17a and the capacitor 17b to each other, along with the AC lines 11 and 12.

In the present embodiment, the power line communication section 22, which performs signal processing for the power line communication device, is provided in the body ECU 2. However, the present invention is not limited thereto. A power line communication device which is different from the body ECU 2 may be installed in the electric vehicle 1, and the power line communication section 22 may be provided in this power line communication device. Even in this case, the coupling transformer 17 need not be installed on the circuit board of the power line communication device, and thus, the power line communication device can be downsized. Further, the power line communication section 22, which performs signal processing for the power line communication device, may be integrated into an ECU having a CPU other than the body ECU 2.

Although the electric vehicle 1 has been described as an example of a vehicle provided with a power line communication function, the present invention is not limited thereto. Such a vehicle may be another vehicle having a function of charging a battery from outside, such as a plug-in hybrid vehicle. Further, although a charging station has been described as an example of a feeding device provided with a power line communication function, the present invention is not limited thereto. Such a feeding device may be another device having a function of feeding a vehicle via a charging cable. For example, in a case where a user plugs a charging cable into an outlet in the user's house and charges a vehicle, a power line communication device may be provided on a switchboard or the like of the house. Furthermore, a circuit that performs power line communication may be installed in a charging cable.

Embodiment 2

Figure 8:
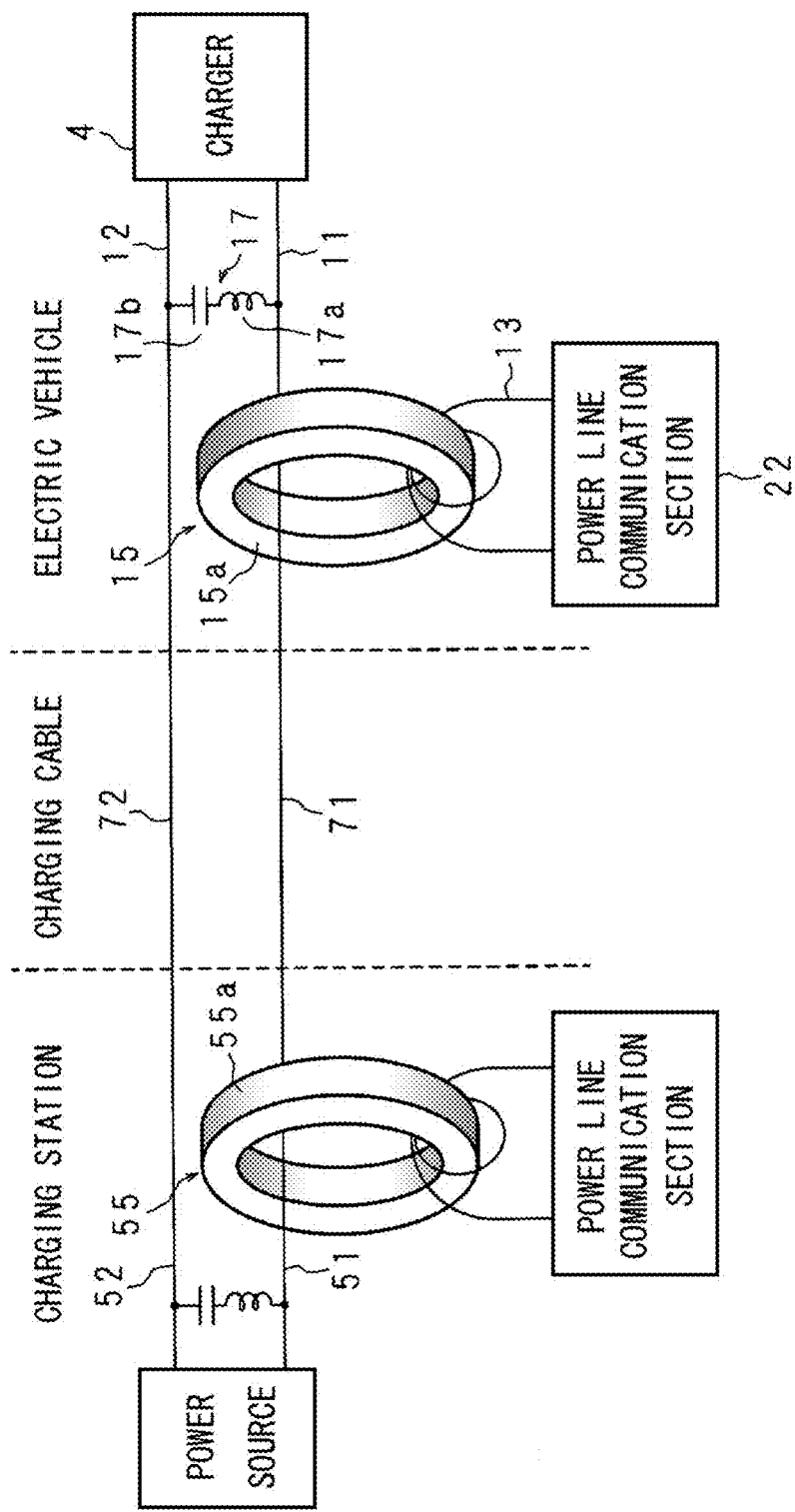
FIG. 8 is a schematic diagram for explaining a configuration of a power line communication system according to embodiment 2.

FIG. 8 is a schematic diagram for explaining a configuration of a power line communication system according to embodiment 2. The configuration of the power line communication system shown in FIG. 8 is specific configurations of the coupling transformers 15 and 55 using the toroidal cores 15a and 55a, respectively, and is substantially equivalent to the configuration of the power line communication system shown in FIG. 1. Since the coupling transformer 15 of the electric vehicle 1 has substantially the same configuration as that of the coupling transformer 55 of the charging station, the configuration of the coupling transformer 15 of the electric vehicle 1 will be described in the following, and description of the coupling transformer 55 of the charging station will be omitted.

The coupling transformer 15 provided in the connector device 3 of embodiment 2 is formed by using the toroidal core 15a which is an annular magnetic body. The toroidal core 15a of the coupling transformer 15 has the one AC line 11 inserted therethrough and has the signal wire 13 wound therearound (at least once), the signal wire 13 being connected to the power line communication section 22. Note that the AC line 11 may be wound around the toroidal core 15a once or more. Moreover, the other AC line 12 is not inserted through the toroidal core 15a. Through this configuration, the AC line 11 inserted through the toroidal core 15a serves as a primary coil and the signal wire 13 wound around the toroidal core 15a serves as a secondary coil, whereby they function as the coupling transformer 15. Further, the filter circuit 17 connected to and between the AC lines 11 and 12 is formed by the coil 17a and the capacitor 17b being connected to each other in series (i.e., having the same configuration as that of the filter circuit 17 of embodiment 1).

Figure 9:
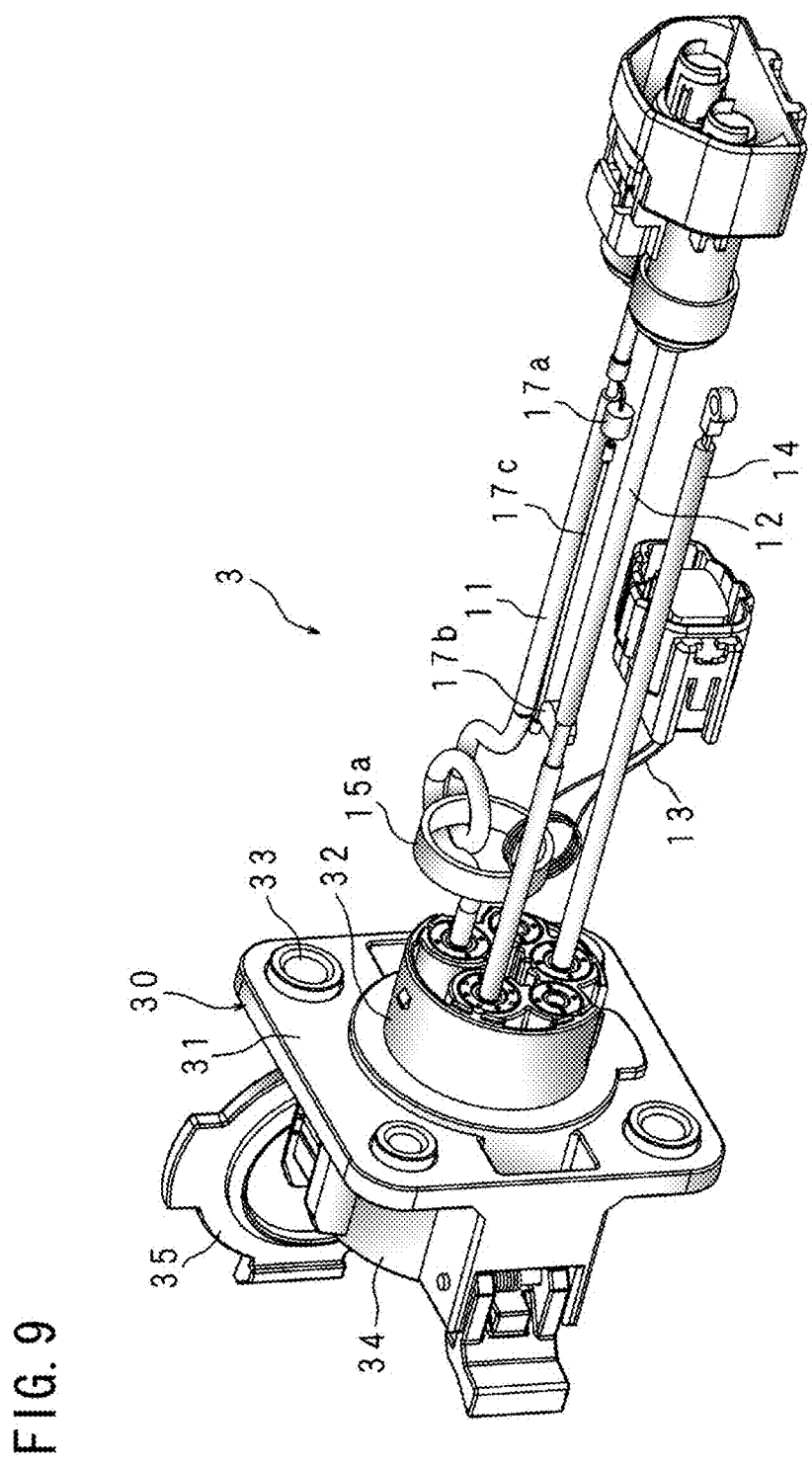
FIG. 9 is an external perspective view showing a configuration of a connector device according to embodiment 2.
Figure 10:
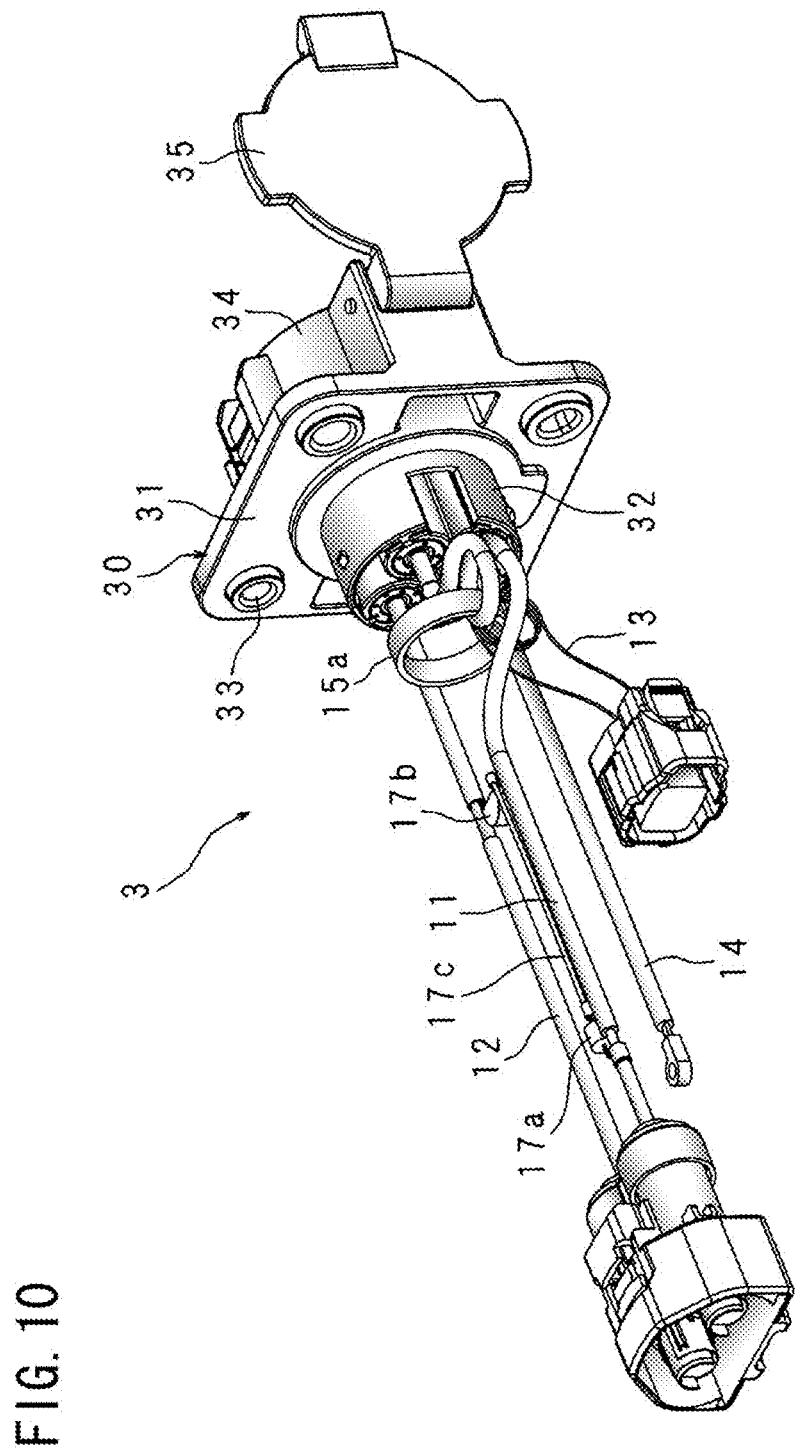
FIG. 10 is an external perspective view showing the configuration of the connector device according to embodiment 2.

Each of FIG. 9 and FIG. 10 is an external perspective view showing a configuration of the connector device 3 according to embodiment 2. The toroidal core 15a forming the coupling transformer 15 of the connector device 3 according to embodiment 2 has an annular shape having a diameter smaller than that of the tubular part 32 of the connector body 30 and is not fitted on the tubular part 32. The toroidal core 15a has the one AC line 11 wound therearound and the signal wire 13 wound therearound, the signal wire 13 being connected to the power line communication section 22. The other AC line 12 is arranged so as not to be inserted through the toroidal core 15a. The toroidal core 15a may be fixed to connector device 3 or the body or the like of the electric vehicle 1, or may be bound, without being fixed, together with the AC lines 11 and 12, the grounding wire 14, and the like to be arranged in the electric vehicle 1.

Note that the other configurations of the connector device 3 according to embodiment 2 are the same as those of the connector device 3 according to embodiment 1.

In the connector device 3 according to embodiment 2 having the above configuration, the coupling transformer 15 is formed by the toroidal core 15a and the AC line 11 and the signal wire 13 that are wound around the toroidal core 15a, and the power line communication section 22 connected to the signal wire 13 superposes signals on the AC line 11 and extracts signals superposed on the AC line 11, whereby power line communication can be performed. According to the configuration in which the toroidal core 15a is not fitted on the tubular part 32 of the connector body 30, it is possible to determine the size of the toroidal core 15a regardless of the configuration of the connector body 30.

Although the connector device 3 shown in FIG. 9 and FIG. 10 has the one AC line 11 wound around the toroidal core 15a, the present invention is not limited thereto. As shown in FIG. 8, the AC line 11 may be simply inserted through the toroidal core 15a. Although the toroidal core 15a has a diameter smaller than that of the tubular part 32, the present invention is not limited thereto. The toroidal core 15a may have the same diameter as that of the tubular part 32 or a greater diameter than that of the tubular part 32.

Embodiment 3

Figure 11:
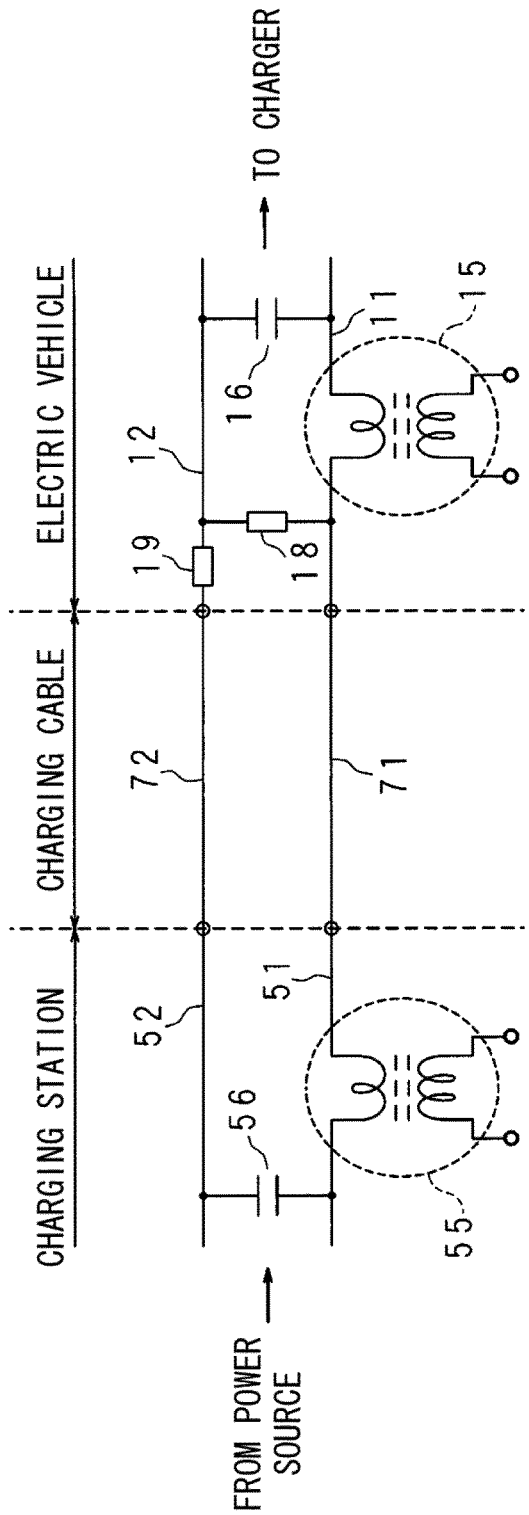
FIG. 11 is a schematic diagram for explaining a configuration of a power line communication system according to embodiment 3 of the present invention.

FIG. 11 is a schematic diagram for explaining a configuration of a power line communication system according to embodiment 3 of the present invention. In the power line communication system according to embodiment 3, a varistor 18 is connected to and between the two AC lines 11 and 12 of the electric vehicle, and a fuse 19 is provided in the AC line 12. The connection position of the varistor 18 in the AC line 11 is between the coupling transformer 15 and a connection terminal to which the charging cable is connected. The arrangement position of the fuse 19 is between, in the AC line 12, a connection terminal to which the charging cable is connected and the connection position of the varistor 18.

The varistor 18 is a resistance element whose resistance value is high when the voltage between terminals is low and decreases when a high voltage is applied between the terminals. In a case where a high voltage is applied between the AC lines 11 and 12 due to a surge or the like, the varistor 18 bypasses the AC lines 11 and 12 to prevent a high voltage from being applied to a charger and the like provided in a deeper portion of the electric vehicle.

The fuse 19 is an element that breaks the current pathway by fusing when a current larger than a rated current has flowed. In a case where a large current has flowed into the AC line 12 from outside due to a surge or the like, the fuse 19 breaks the AC line 12, thereby being able to prevent a large current from flowing into a charger and the like provided in a deeper portion of the vehicle.

Figure 12:
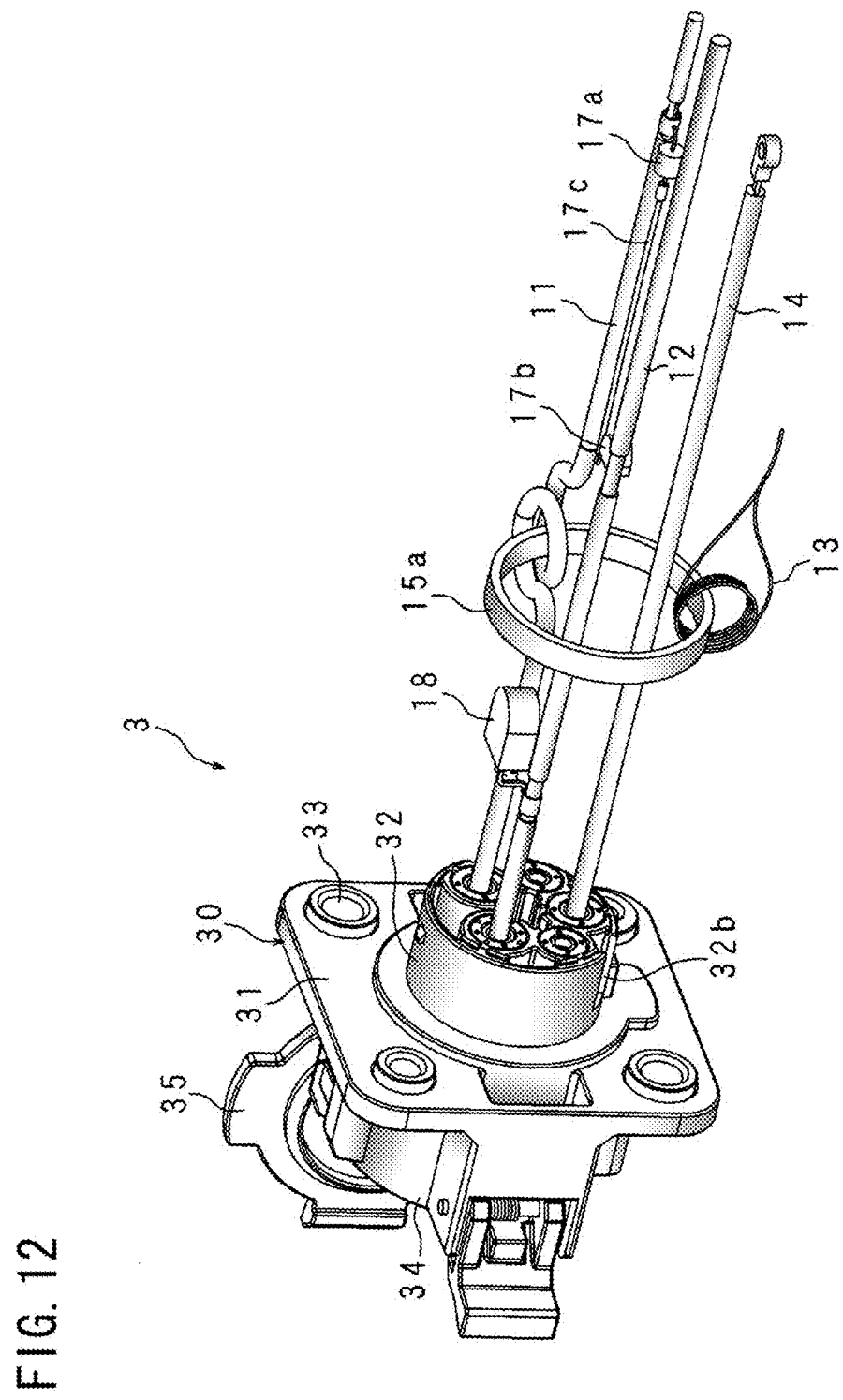
FIG. 12 is an external perspective view showing an example of a configuration of a connector device according to embodiment 3.

FIG. 12 is an external perspective view showing one example of a configuration of the connector device 3 according to embodiment 3. The connector device 3 of embodiment 3 shown in FIG. 12 is formed by adding the varistor 18 to the connector device 3 according to embodiment 1 shown in FIG. 5. In FIG. 12, the fuse 19 is not shown.

The varistor 18 is a circuit component with two terminals. One terminal of the varistor 18 is connected to the AC line 11, at an appropriate position from where the AC line 11 extends from the tubular part 32 to where the AC line 11 is wound around the toroidal core 15a. The other terminal of the varistor 18 is connected to the AC line 12, at an appropriate position from where the AC line 12 extends from the tubular part 32 to where the capacitor 17b is connected to the AC line 12. The connection of the terminals of the varistor 18 to the AC lines 11 and 12 is performed, by soldering, welding, or the like the terminals of the varistor 18 to exposed portions of the conductive wires of the AC lines 11 and 12 from which some of the insulators have been removed.

In the connector device 3 according to embodiment 3 having the above configuration, the varistor 18 is connected to and between the AC lines 11 and 12 and the fuse 19 is arranged in the AC line 12. Accordingly, even in a case where a lightning strike has occurred while charging the electric vehicle 1 and a surge voltage or current has entered the circuitry, it is possible to prevent apparatuses in the electric vehicle 1 such as the charger 4 from being damaged by these.

Further, according to the configuration in which the varistor 18 is connected to the AC lines 11 and 12, at a position from where the AC lines 11 and 12 extend from the tubular part 32 to where the AC line 11 is wound around the toroidal core 15a, it is possible to prevent, at a further out position, damage to the electric vehicle 1 due to a surge. In particular, it is possible to prevent damage to the coupling transformer 15 due to a surge.

Since the other configurations of the connector device 3 according to embodiment 3 are similar to those of the connector device 3 according to embodiment 1, similar components are denoted by the same reference numerals, and detailed description thereof will be omitted.

Embodiment 4

Figure 13:
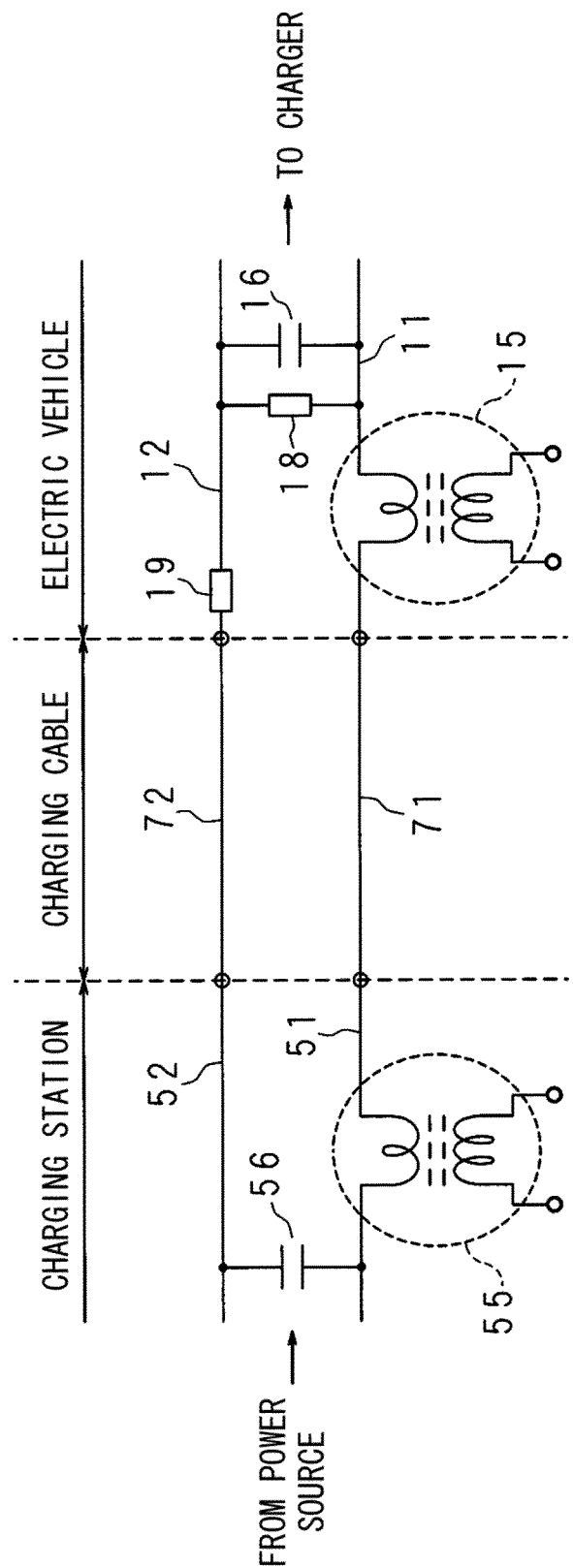
FIG. 13 is a schematic diagram for explaining a configuration of a power line communication system according to embodiment 4 of the present invention.

FIG. 13 is a schematic diagram for explaining a configuration of a power line communication system according to embodiment 4 of the present invention. In the power line communication system according to embodiment 4, similarly to the power line communication system according to embodiment 3, the varistor 18 is connected to and between the two AC lines 11 and 12 of the electric vehicle and the fuse 19 is provided in the AC line 12. However, in the power line communication system according to embodiment 4, the connection position of the varistor 18 in the AC line 11 is between the coupling transformer 15 and the capacitor 16 serving as the filter circuit. The arrangement position of the fuse 19 is between, in the AC line 12, a connection terminal to which the charging cable is connected and the connection position of the varistor 18. Roles of the varistor 18 and the fuse 19 are the same as those in the power line communication system according to embodiment 3.

Figure 14:
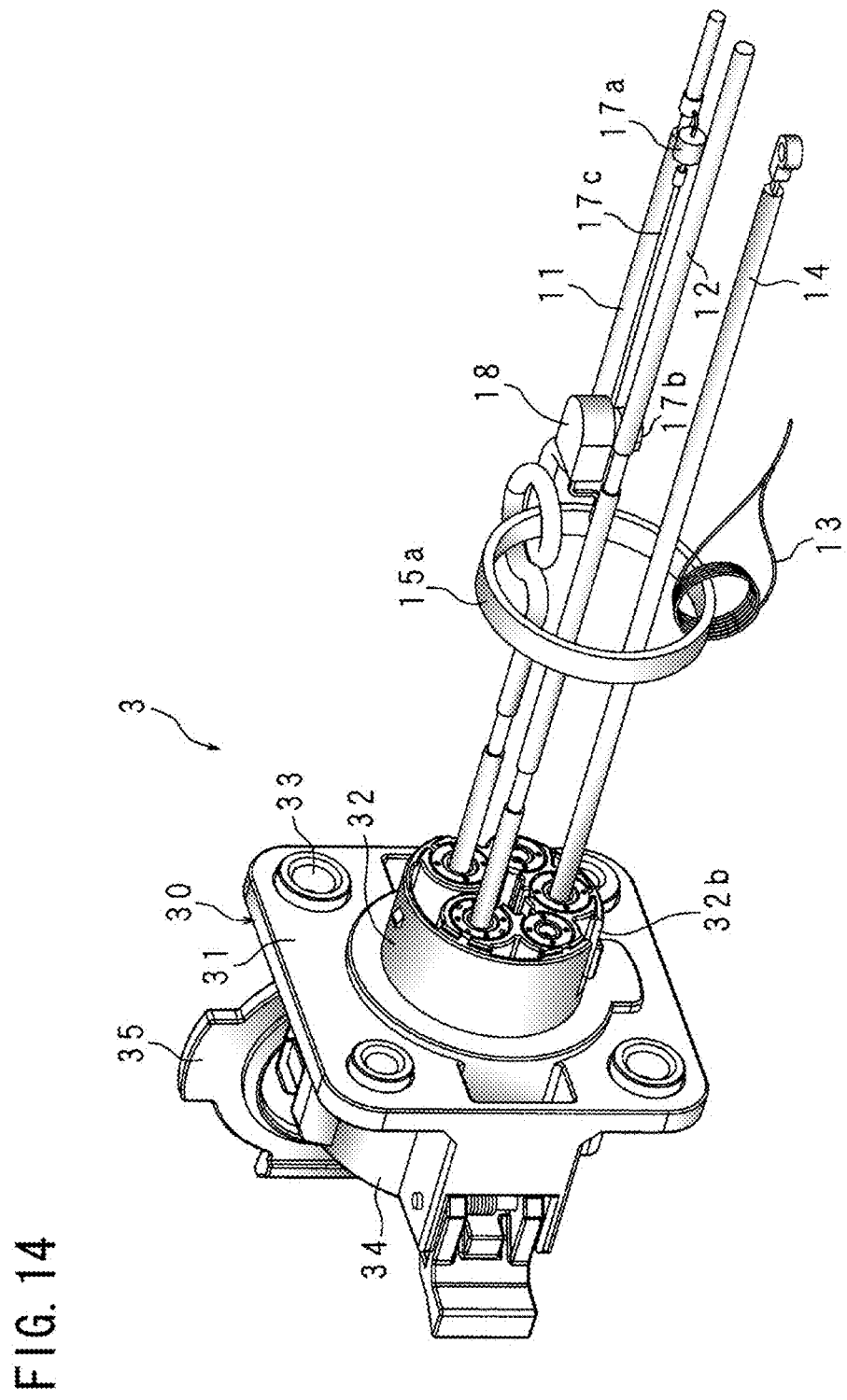
FIG. 14 is an external perspective view showing an example of a configuration of a connector device according to embodiment 4.

FIG. 14 is an external perspective view showing an example of a configuration of the connector device 3 according to embodiment 4. The connector device 3 of embodiment 4 shown in FIG. 14 is formed by adding the varistor 18 to the connector device 3 according to embodiment 1 shown in FIG. 5. In FIG. 14, the fuse 19 is not shown.

One terminal of the varistor 18 is connected to the AC line 11, at an appropriate position from where the AC line 11 is wound around the toroidal core 15a to where the coil 17a is connected to the AC line 11. The other terminal of the varistor 18 is connected to in the AC line 12, at an appropriate position from where the AC line 12 extends from the tubular part 32 to where the capacitor 17b is connected to the AC line 12. The connection of the terminals of the varistor 18 to the AC lines 11 and 12 is performed, by soldering, welding, or the like the terminals of the varistor 18 to exposed portions of the conductive wires of the AC lines 11 and 12 from which some of the insulators have been removed.

In the connector device 3 according to embodiment 4 having the above configuration, the varistor 18 is connected to and between the AC lines 11 and 12 and the fuse 19 is arranged in the AC line 12. Accordingly, as in the connector device 3 according to embodiment 3, even in a case where a lightning strike has occurred while charging the electric vehicle 1 and a surge voltage or current has entered the circuitry, it is possible to prevent apparatuses in the electric vehicle 1 such as the charger 4 from being damaged by these.

Further, according to the configuration in which the varistor 18 is connected to the AC line 11, at a position from where the AC line 11 is wound around the toroidal core 15a to where the filter circuit 17 is connected to the AC line 11, when the toroidal core 15a is to be fitted on the tubular part 32, the varistor 18 does not obstruct the fitting operation. Therefore, assembly of the connector device 3 can be facilitated.

In each of the power line communication systems according to embodiments 1 to 4, the primary coil of the coupling transformer 15 is provided in the one AC line 11 on the electric vehicle side, and similarly, the primary coil of the coupling transformer 55 is provided in the one AC line 51 on the charging station side (see FIG. 1, etc.). However, the present invention is not limited thereto.

Since the other configurations of the connector device 3 according to embodiment 4 are similar to those of the connector device 3 according to embodiment 1, similar components are denoted by the same reference numerals, and detailed description thereof will be omitted.

Embodiment 5

Figure 15:
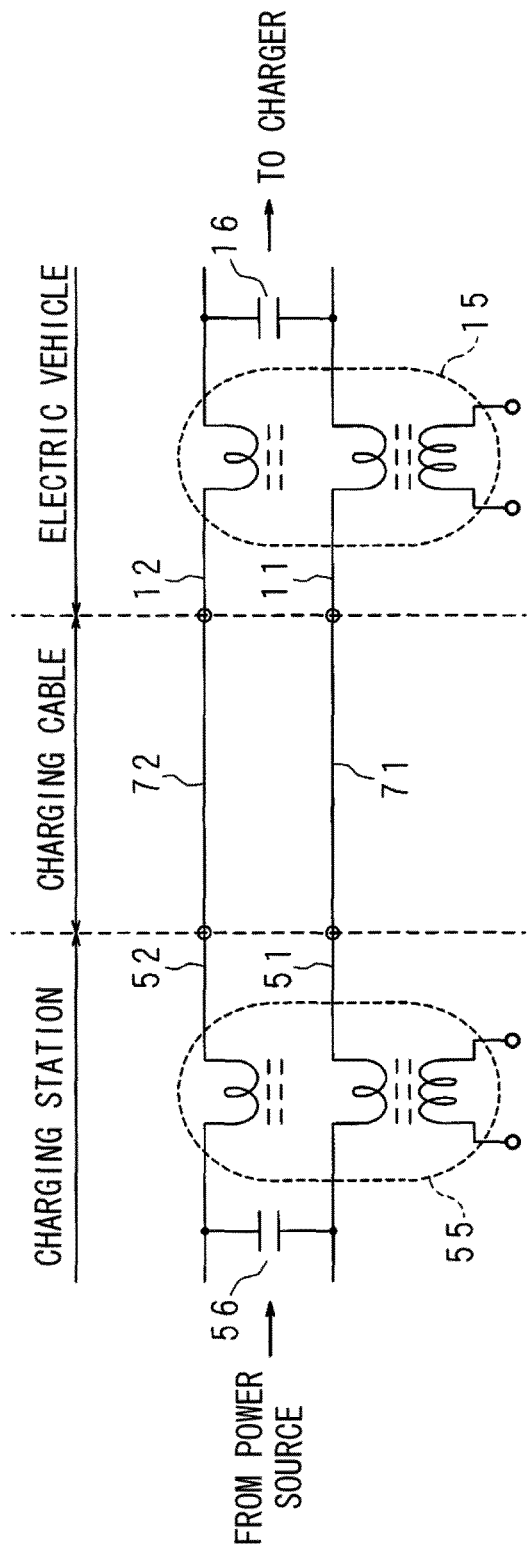
FIG. 15 is a schematic diagram for explaining a configuration of a power line communication system according to embodiment 5.
Figure 16:
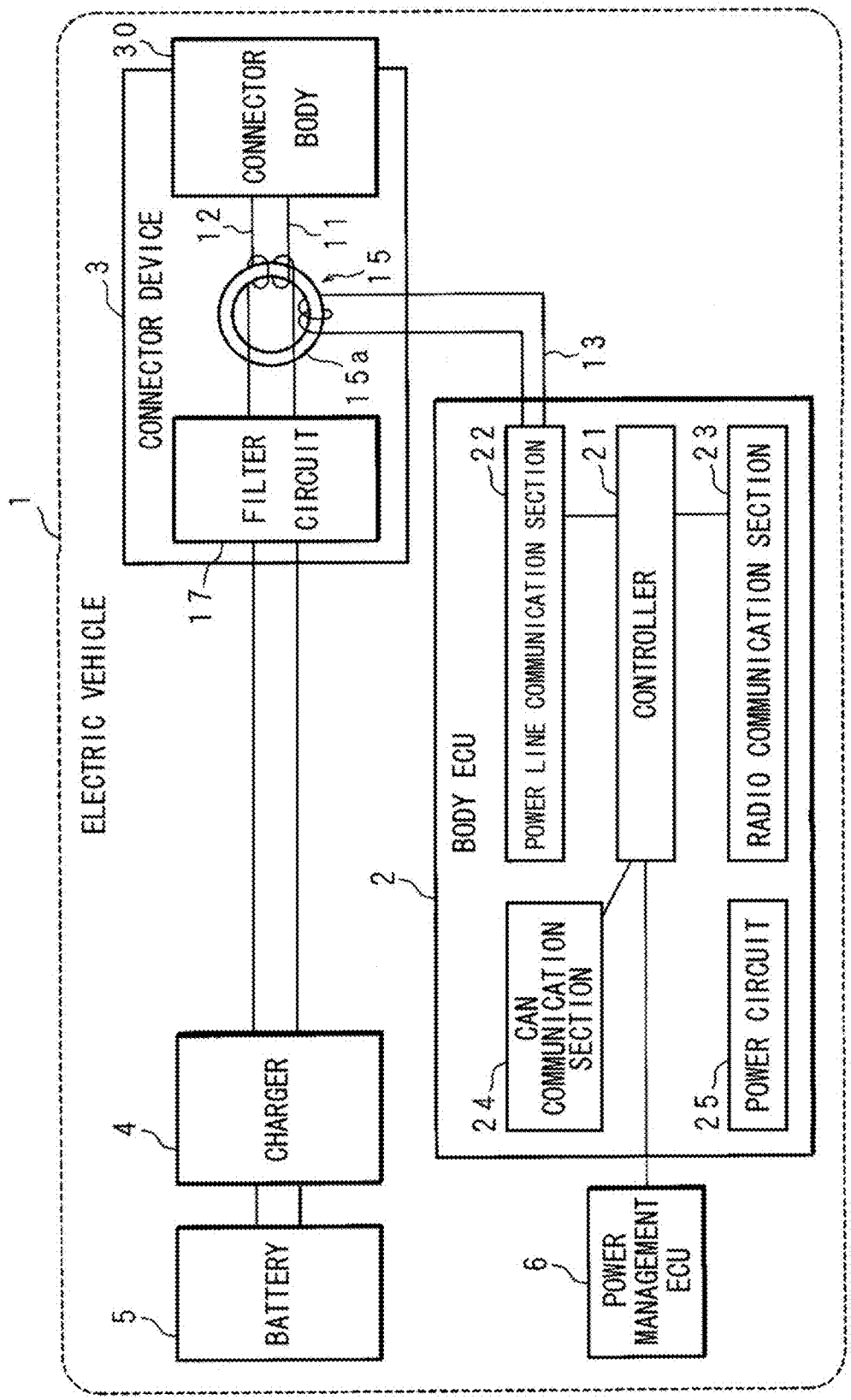
FIG. 16 is a block showing an internal configuration of an electric vehicle corresponding to the power line communication system according to embodiment 5 of the present invention.

FIG. 15 is a schematic diagram for explaining a configuration of a power line communication system according to embodiment 5. FIG. 16 is a block diagram showing an internal configuration of the electric vehicle 1 corresponding to the power line communication system according to embodiment 5 of the present invention. The power line communication system according to embodiment 5 is configured such that a primary coil of the coupling transformer 55 is provided in each of the AC lines 51 and 52 on the charging station side, and a secondary coil corresponding to these is connected to the power line communication section in the charging station.

Similarly, a primary coil of the coupling transformer 15 is provided in each of the AC lines 11 and 12 on the electric vehicle 1 side, and a secondary coil corresponding to these is connected to the power line communication section 22 of the body ECU 2 in the electric vehicle 1. The power line communication section 22 of the body ECU 2 is connected via the signal wire 13 to the coupling transformer 15 provided in the connector device 3 (note that the signal wire 13 forms a secondary coil by being wound around the toroidal core 15a of the coupling transformer 15, and thus, is also part of the coupling transformer 15).

The coupling transformer 15 provided in the connector device 3 according to embodiment 5 is formed by winding both of the AC lines 11 and 12 and the signal wire 13 around the toroidal core 15a which is an annular magnetic body. Detailed configuration of the connector device 3 will be described later.

Figure 17:
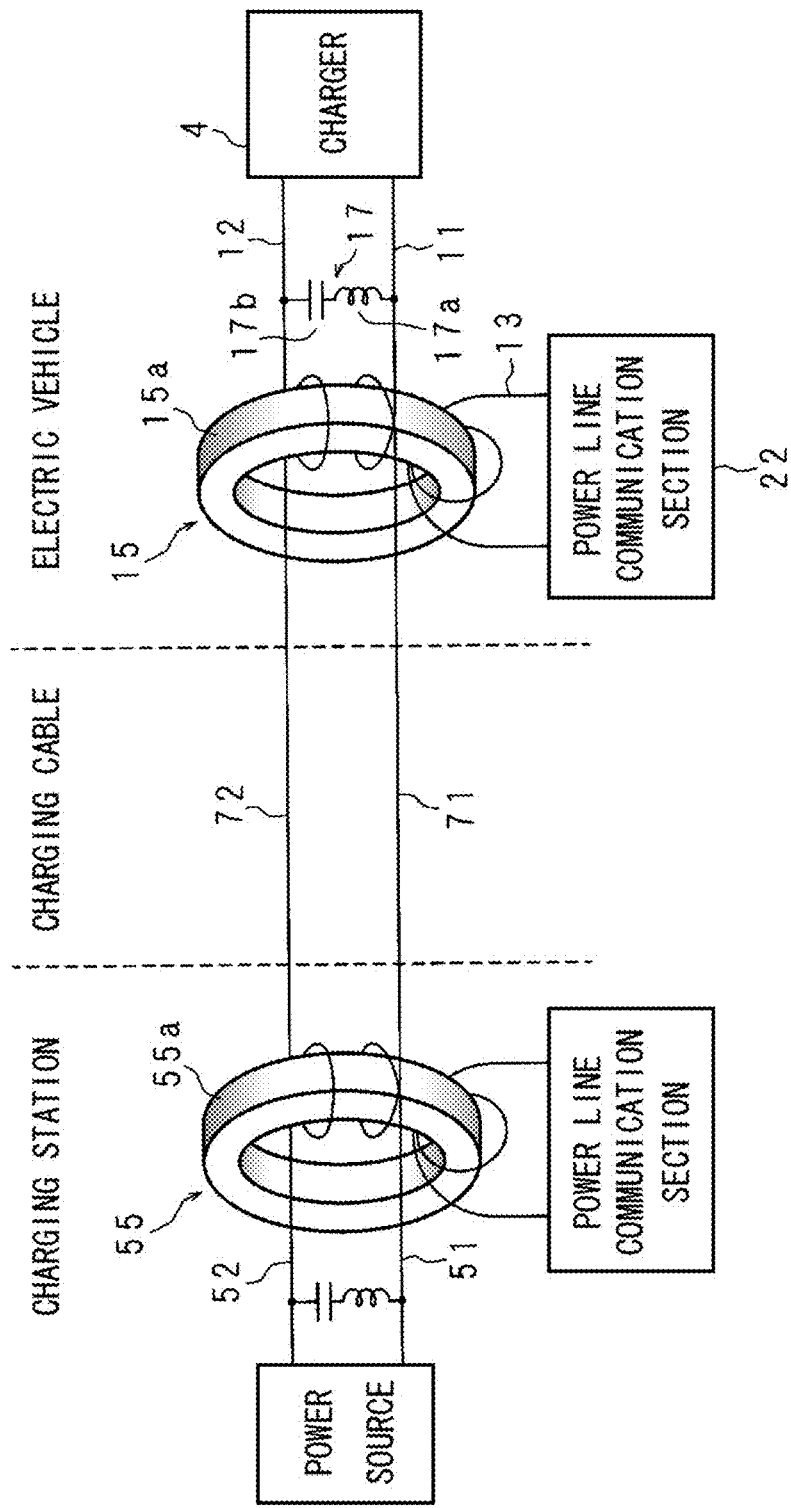
FIG. 17 is a schematic diagram for explaining a configuration of the power line communication system according to embodiment 5.

FIG. 17 is a schematic diagram for explaining a configuration of the power line communication system according to embodiment 5. The configuration of the power line communication system shown in FIG. 17 is substantially equivalent to that of the power line communication system shown in FIG. 15, and is specific configurations of the coupling transformers 15 and 55 which use the toroidal cores 15a and 55a. Since the coupling transformer 15 of the electric vehicle 1 has substantially the same configuration as that of the coupling transformer 55 of the charging station, the configuration of the coupling transformer 15 of the electric vehicle 1 will be described in the following, and description of the coupling transformer 55 of the charging station will be omitted.

The coupling transformer 15 provided in the connector device 3 according to embodiment 5 is formed by using the toroidal core 15a which is an annular magnetic body. The coupling transformer 15 is configured such that the one AC line 11 is wound (at least once) around the toroidal core 15a, the other AC line 12 is wound (at least once) around the toroidal core 15a, and the signal wire 13 connected to the power line communication section 22 is wound (at least once) around the toroidal core 15a. In this configuration, the AC lines 11 and 12 that are wound around the toroidal core 15a serve as a primary coil, and the signal wire 13 wound around the toroidal core 15a serves as a secondary coil, whereby they function as the coupling transformer 15.

Note that the AC lines 11 and 12 are wound around the toroidal core 15a such that their winding directions are opposite to each other. That is, the winding direction of the AC lines 11 and 12 are set such that directions of magnetic fluxes in the toroidal core 15a generated by the currents flowing in the AC lines 11 and 12 are the same. Accordingly, a signal for power line communication transmitted and received between the electric vehicle 1 and the charging station becomes a differential signal, and thus, noise tolerance characteristics of the power line communication can be improved. Moreover, since the number of turns of the primary coil of the coupling transformer 15 is increased, communication characteristics can be improved.

By connecting the charging station and the electric vehicle 1 to each other with a charging cable, two power supply paths are formed: an energizing path in which the AC line 51 of the charging station, the AC line 71 of the charging cable, and the AC line 11 of the electric vehicle are connected; and an energizing path in which the AC line 52 of the charging station, the AC line 72 of the charging cable, and the AC line 12 of the electric vehicle are connected. In the power line communication system according to embodiment 5, the primary coil is provided in each of the energizing paths in the charging station and in the electric vehicle 1. Therefore, the connection direction of the charging cable may be set freely. In a state where the charging station and the electric vehicle 1 are connected to each other with the charging cable, a closed current loop circuit is formed by the above two power supply paths and the capacitors 16 and 56. Thus, it is possible to superpose signals on the AC lines 11, 12, 51, 52, 71, and 72 and extract signals superposed on the AC lines 11, 12, 51, 52, 71, and 72 by means of the coupling transformers 15 and 55 arranged in this loop, whereby power line communication can be performed between the charging station and the electric vehicle.

Figure 18:
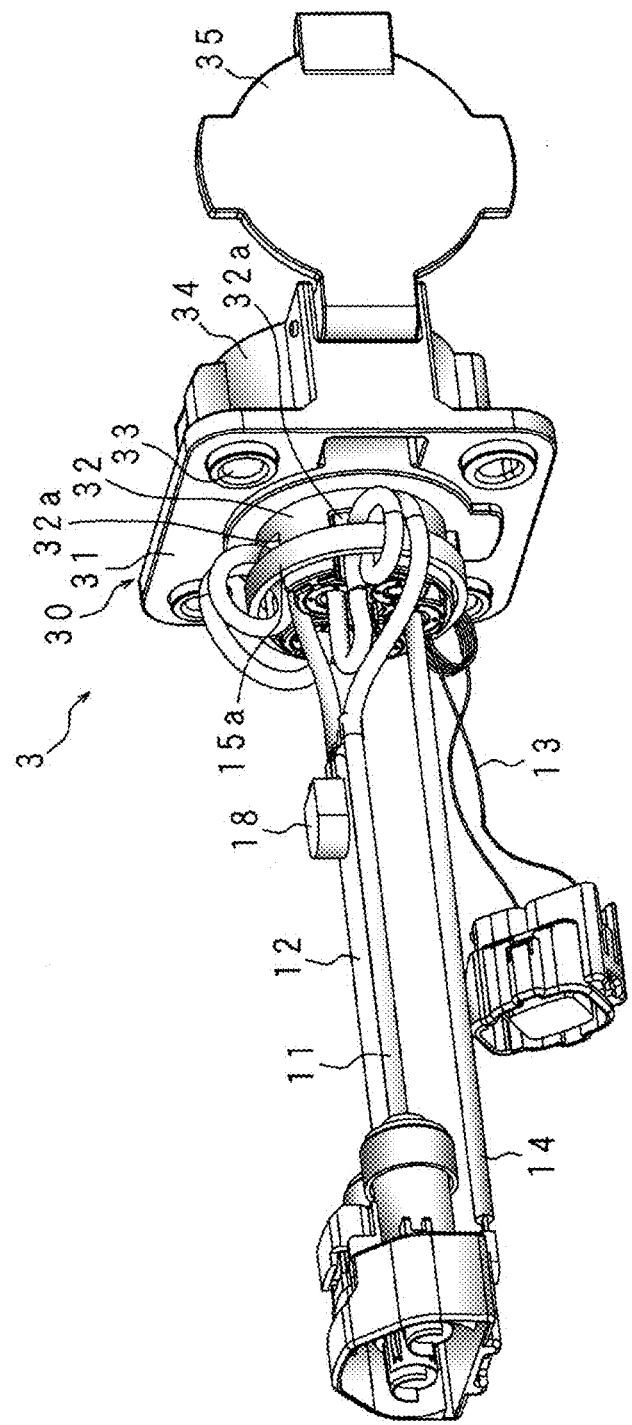
FIG. 18 is an external perspective view showing a configuration of a connector device according to embodiment 5.
Figure 19:
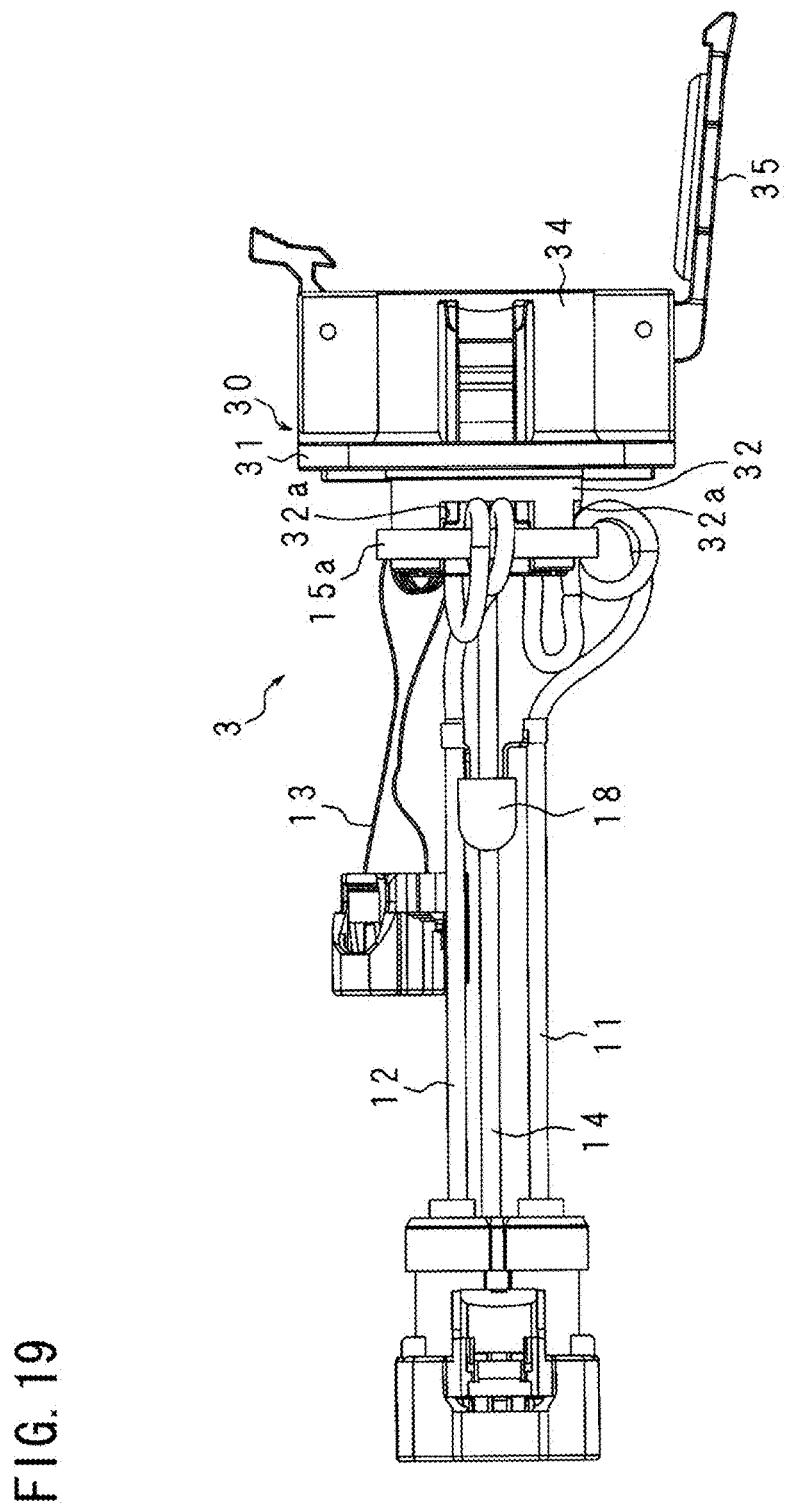
FIG. 19 is a side view showing the configuration of the connector device according to embodiment 5.
Figure 20:
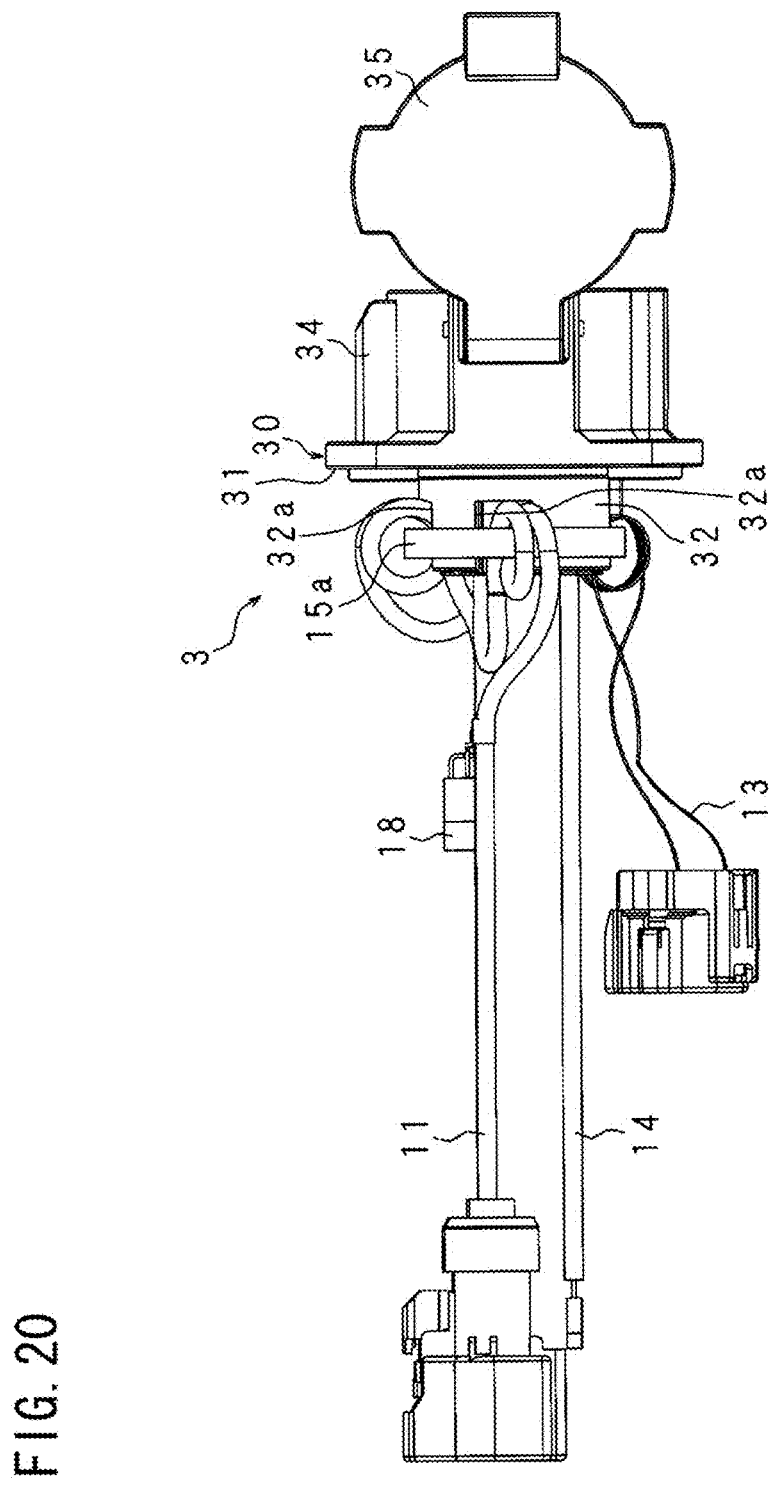
FIG. 20 is a side view showing the configuration of the connector device according to embodiment 5.
Figure 21:
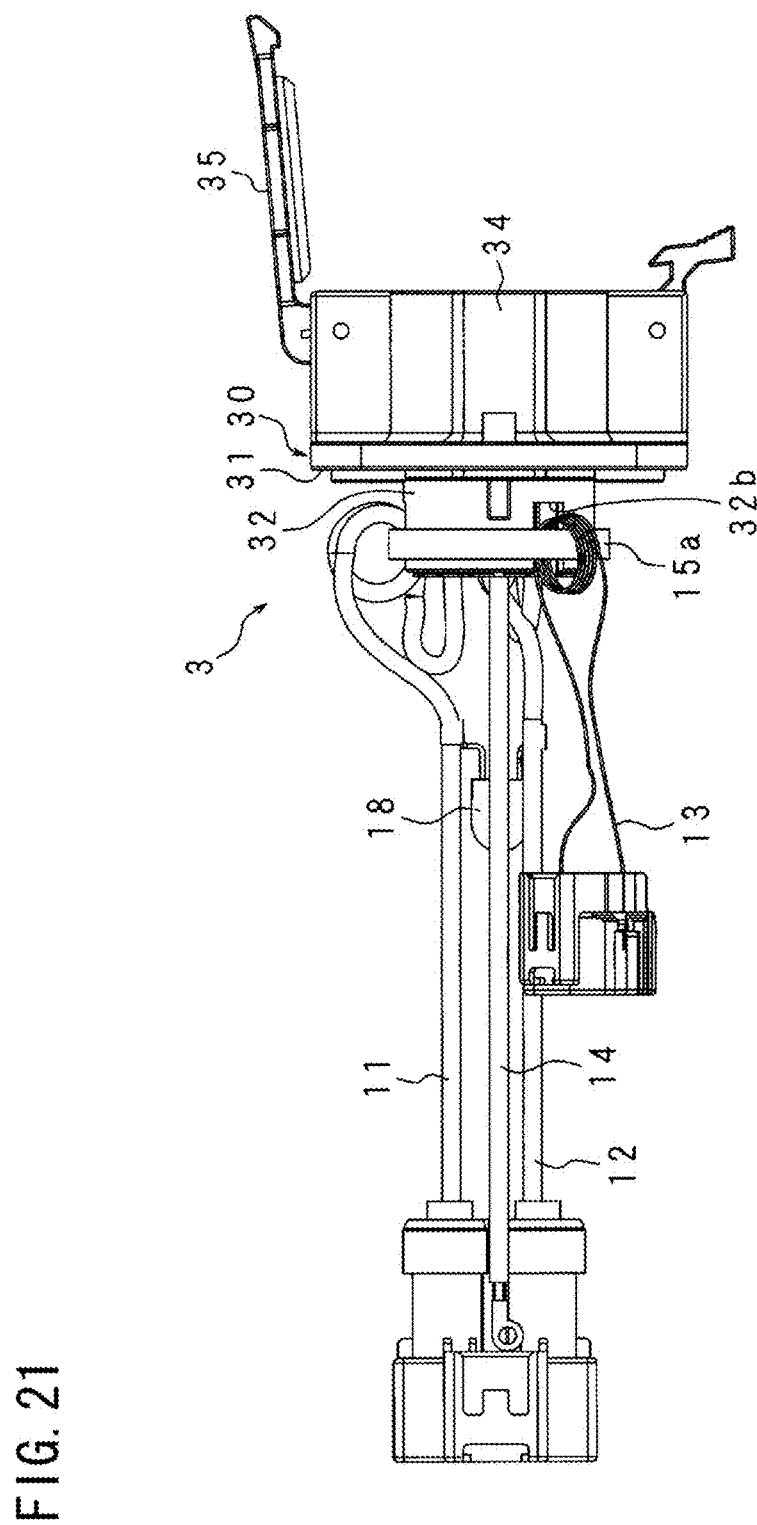
FIG. 21 is a side view showing the configuration of the connector device according to embodiment 5.
Figure 22:
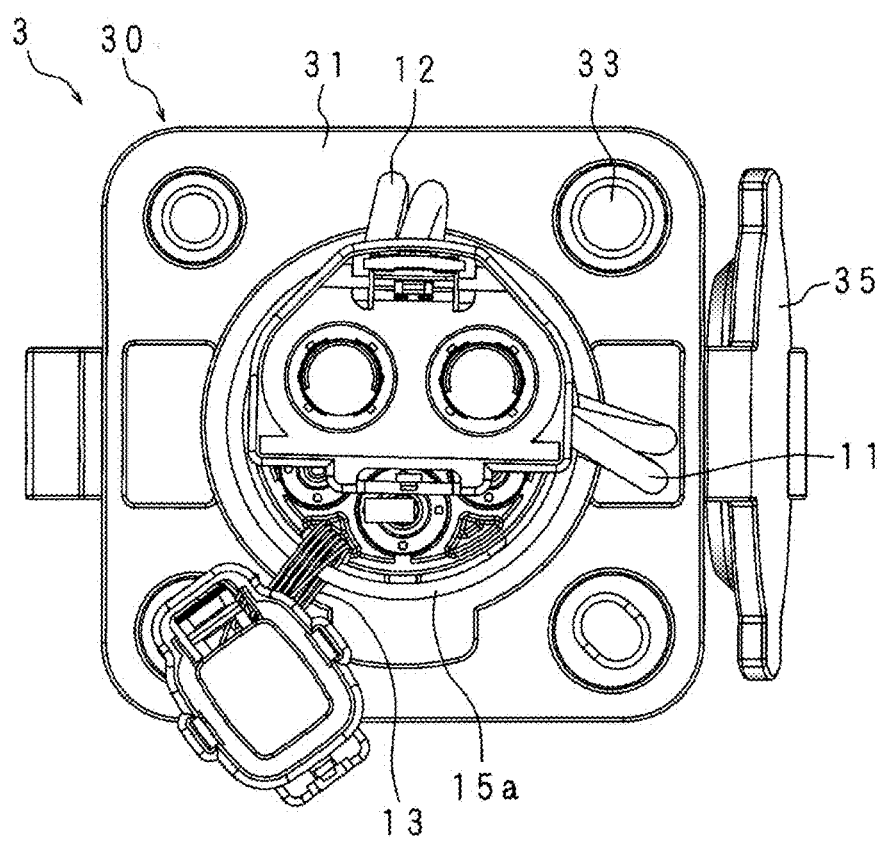
FIG. 22 is a front view showing the configuration of the connector device according to embodiment 5.
Figure 23:
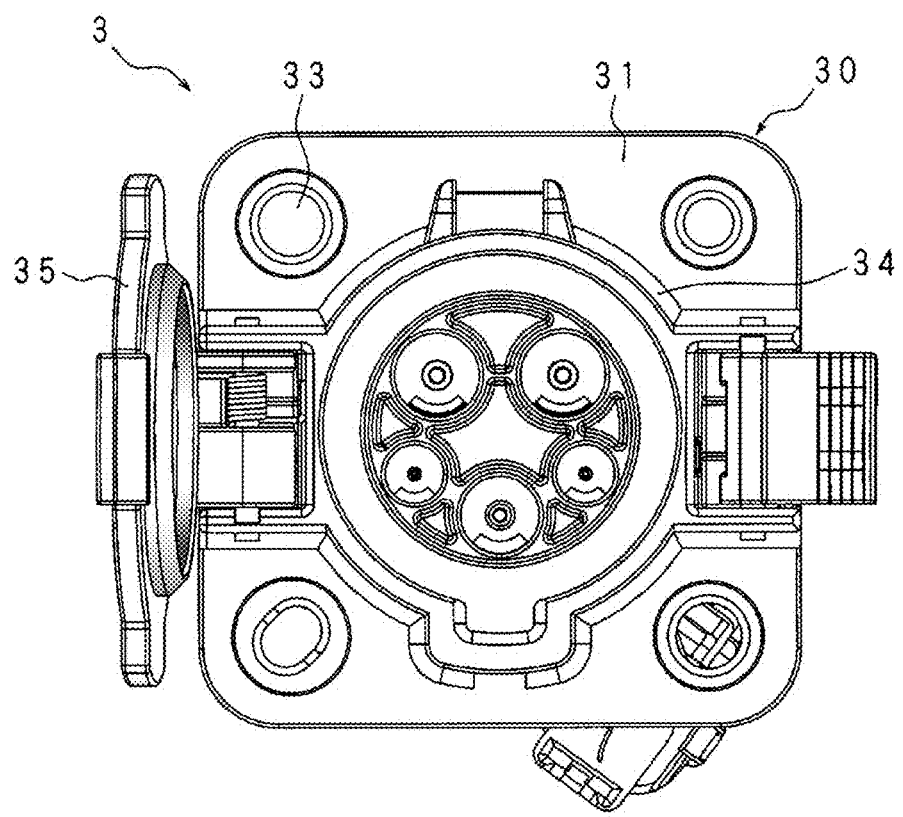
FIG. 23 is a rear view showing the configuration of the connector device according to embodiment 5.

FIG. 18 is an external perspective view showing a configuration of the connector device 3 according to embodiment 5, and shows an external view of a portion of the connector device 3 that should be positioned inside the electric vehicle 1 when it is installed in the electric vehicle 1. Each of FIG. 19 to FIG. 21 is a side view showing the configuration of the connector device 3 according to embodiment 5. FIG. 19 shows the configuration of the connector device 3 viewed from above in FIG. 18. FIG. 20 shows the configuration of the connector device 3 viewed from the front direction in FIG. 18. FIG. 21 shows the configuration of the connector device 3 viewed from below in FIG. 18. FIG. 22 is a front view showing the configuration of the connector device 3 according to embodiment 5. FIG. 23 is a rear view showing the configuration of the connector device 3 according to embodiment 5.

The connector device 3 includes the connector body 30 which houses a plurality of connection terminals (not shown) to which the two AC lines 11 and 12, the grounding wire 14, and the like are connected. The connector body 30 includes the attachment part 31 having a substantially-rectangular and plate-like shape, and the cylindrical tubular part 32 provided at the center of a face of the attachment part 31 so as to project therefrom. The AC lines 11 and 12 and the grounding wire 14, which are connected to a plurality of connection terminals housed in the cable connection part 34, are provided in such as manner as to pass through the attachment part 31 of the connector body 30 to be inserted through the tubular part 32.

The two AC lines 11 and 12, which are inserted through the tubular part 32 to be led to an inner portion of the electric vehicle 1, are each wound around the toroidal core 15a which is an annular magnetic body. By allowing a current to flow in the AC lines 11 and 12 wound around the toroidal core 15a, magnetic fluxes are generated in the toroidal core 15a. Here, the AC lines 11 and 12 are wound around the toroidal core 15a in opposite directions to each other such that the direction of the magnetic flux generated by the current flowing in the AC line 11 and the direction of the magnetic flux generated by the current flowing in the AC line 12 are the same.

Further, the grounding wire 14 is not wound around the toroidal core 15a but is inserted through the toroidal core 15a to be led to an inner portion of the electric vehicle 1. Further, the toroidal core 15a has the signal wire 13 wound therearound, the signal wire 13 being connected to the power line communication section 22 of the body ECU 2.

The toroidal core 15a for forming the coupling transformer 15 is configured to be externally fitted on the tubular part 32 of the connector body 30. After the AC lines 11 and 12 and the signal wire 13 are wound around the toroidal core 15a, the toroidal core 15a is fitted on the tubular part 32, whereby the connector device 3 is assembled. The tubular part 32 is provided with two cutouts 32a formed for housing the AC lines 11 and 12 wound around the toroidal core 15a and a cutout 32b for housing the signal wire 13 wound around the toroidal core 15a, when the toroidal core 15a is fitted on the tubular part 32. Each of the cutouts 32a and 32b is cut out along the axis direction of the tubular part 32 to reach the edge of the tubular part 32, into a substantially rectangular shape.

The connector device 3 according to embodiment 5 has a similar configuration to that of the connector device 3 according to embodiment 1, and includes the coil 17a and the capacitor 17b of the filter circuit 17. However, the coil 17a and the capacitor 17b are not shown in FIG. 18 to FIG. 23.

Figure 24:
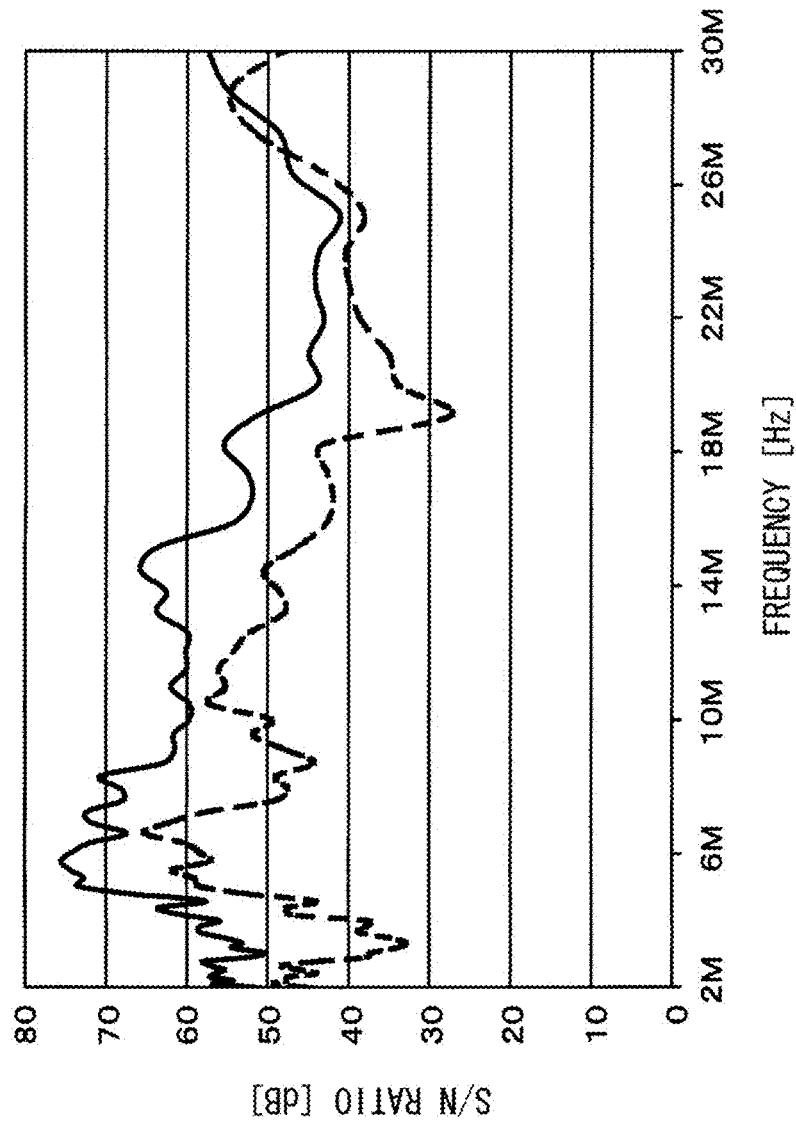
FIG. 24 is a schematic diagram for explaining an effect of the power line communication system according to embodiment 5.

FIG. 24 is a schematic diagram for explaining an effect of the power line communication system according to embodiment 5. In FIG. 24, measurement results of frequency—S/N ratio characteristics are graphed and compared between the configurations of embodiments 1 to 4 in which only the one AC line 11 is wound around the toroidal core 15a (see the broken line in FIG. 24) and the configuration of embodiment 5 in which both of the AC lines 11 and 12 are wound around the toroidal core 15a (see the solid line in FIG. 24).

As shown in FIG. 24, according to the configuration in which both of the AC lines 11 and 12 are wound around the toroidal core 15a, the S/N ratio is improved, especially in low frequencies. Further, with respect to the measurement results shown in FIG. 24, when the average values of the S/N ratio are compared, the average value of the S/N ratio is 47.0 dB in the configuration in which the one AC line 11 is wound, whereas the average value of the S/N ratio was 58.9 dB in the configuration in which both of the AC lines 11 and 12 are wound.

In the power line communication system according to embodiment 5 having the above configuration, the two AC lines 11 and 12 are wound around the toroidal core 15a to form the primary coil of the coupling transformer 15 in the connector device 3. Accordingly, it is possible to improve communication characteristics such as the S/N ratio at the time of power line communication, compared with the configuration in which only the one AC line 11 is wound around the toroidal core 15a.

Since the other configurations of the connector device 3 according to embodiment 5 are similar to those of the connector device 3 according to embodiment 1, similar components are denoted by the same reference numerals and detailed description thereof will be omitted.

Embodiment 6

Figure 25:
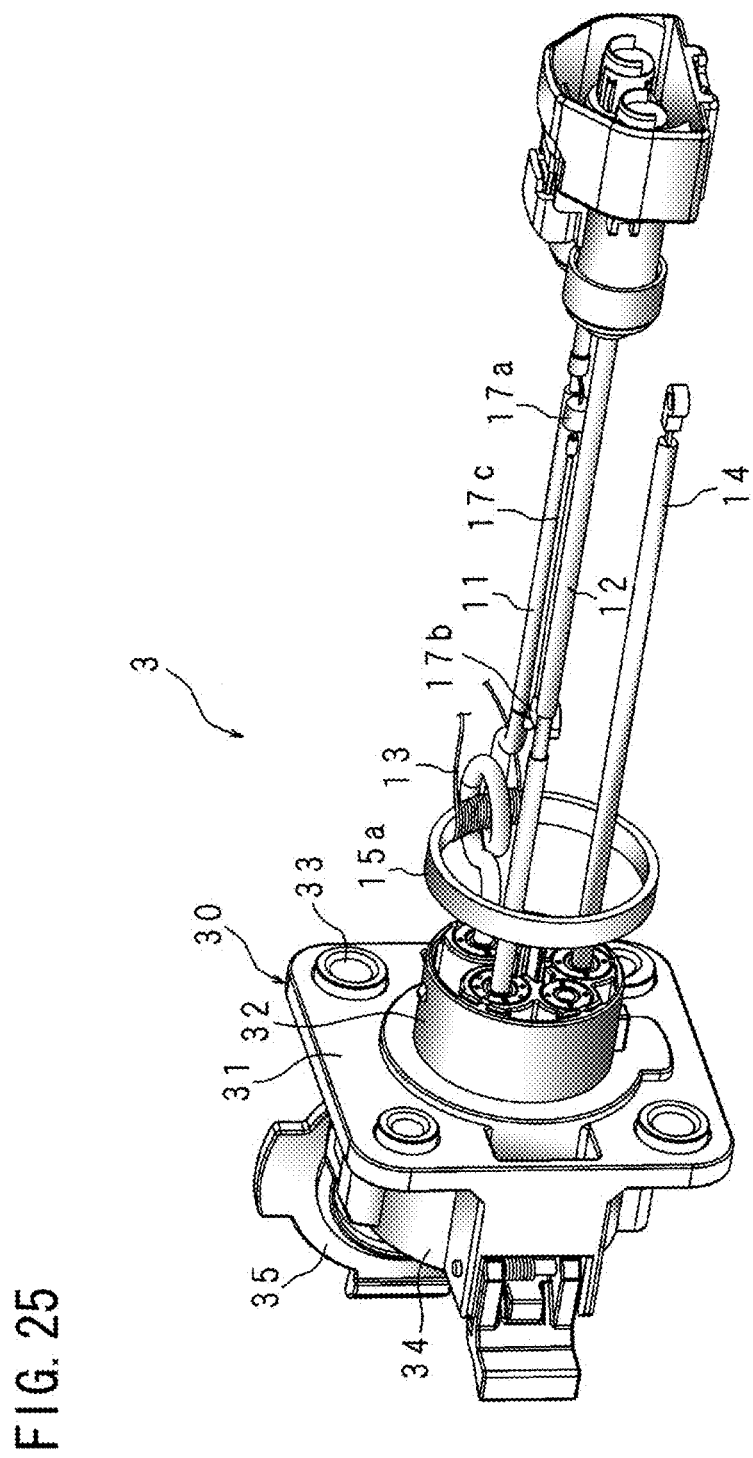
FIG. 25 is an external perspective view showing a configuration of a connector device according to embodiment 6.
Figure 26:
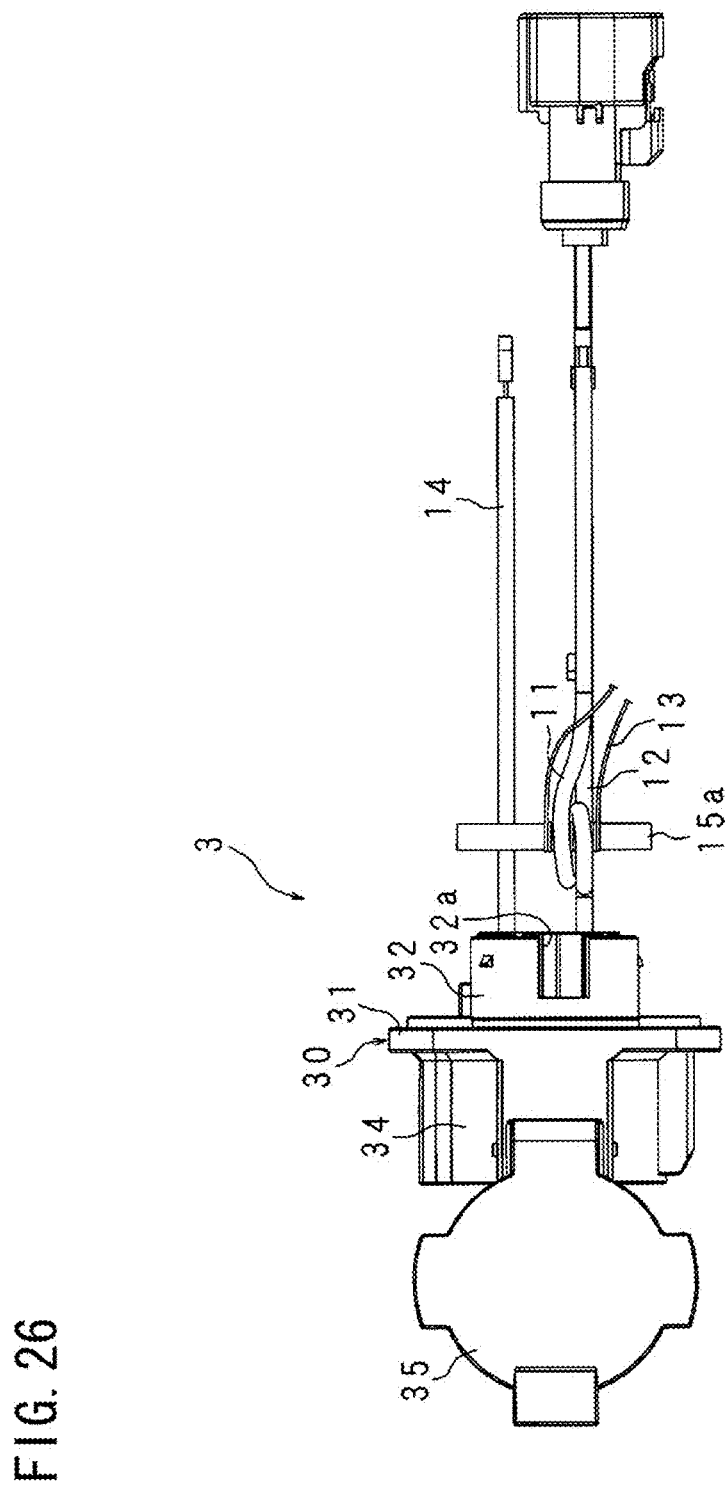
FIG. 26 is a side view showing the configuration of the connector device according to embodiment 6.

FIG. 25 is an external perspective view showing a configuration of the connector device 3 according to embodiment 6, and shows an external view of a portion of the connector device 3 that should be positioned inside the electric vehicle 1 when it is installed in the electric vehicle 1. FIG. 26 is a side view showing the configuration of the connector device 3 according to embodiment 6, viewed from the depth direction in FIG. 25. The connector device 3 according to embodiment 6 has substantially the same configuration of the connector device 3 according to embodiment 1 shown in FIG. 5, FIG. 6, and the like, but the winding position of the signal wire 13 on the toroidal core 15a is different from that in the connector device 3 according to embodiment 1.

In the connector device 3 according to embodiment 6, the signal wire 13 connected to the power line communication section 22 of the body ECU 2 is wound around the toroidal core 15a, and the one AC line 11 is wound around the toroidal core 15a so as to overlap the wound portion of the signal wire 13. That is, the signal wire 13 is wound at the same position where the AC line 11 is wound.

Further, the cutout 32a formed in the tubular part 32 is capable of housing the wound portion of the AC line 11 around the toroidal core 15a and the wound portion of the signal wire 13 around the toroidal core 15a in a case where the toroidal core 15a is externally fitted on the tubular part 32. Accordingly, the cutout 32b for housing only the signal wire 13 is not formed in the tubular part 32 of the connector device 3 according to embodiment 6.

Figure 27:
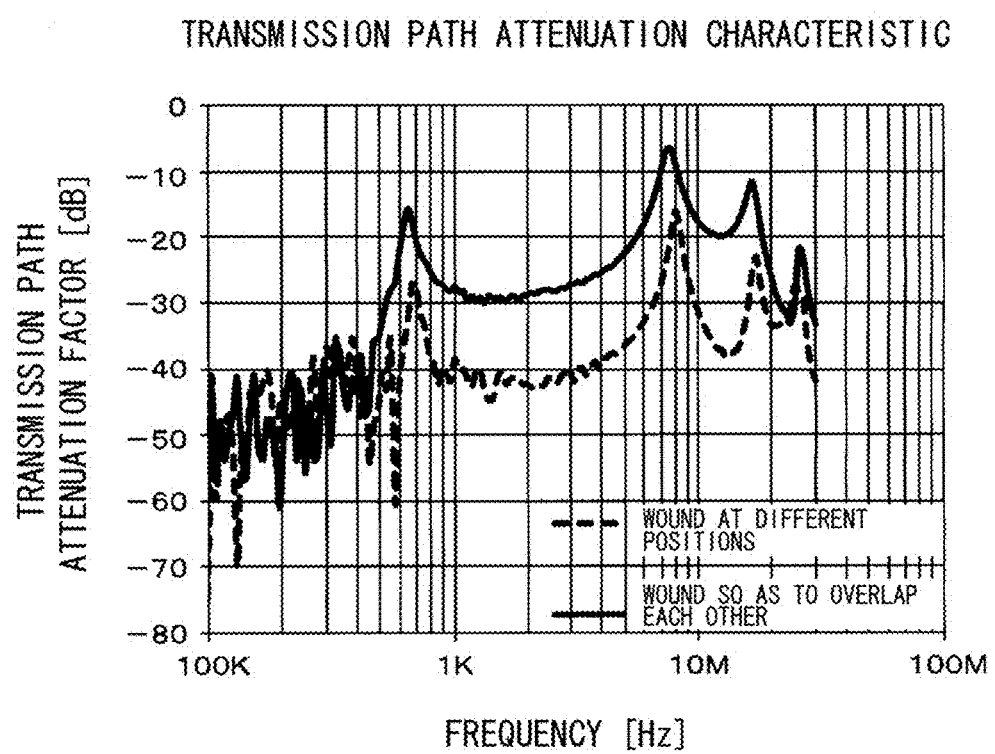
FIG. 27 is a schematic diagram for explaining an effect of a power line communication system according to embodiment 6.

FIG. 27 is a schematic diagram for explaining an effect of the power line communication system according to embodiment 6. In FIG. 27, measurement results of transmission path attenuation characteristics are graphed and compared between the configuration of embodiment 1 in which the AC line 11 and the signal wire 13 are wound at different positions on the toroidal core 15a (see the broken line in FIG. 27) and the configuration of embodiment 6 in which the AC line 11 and the signal wire 13 are wound at the same position on the toroidal core 15a so as to overlap each other (see the solid line in FIG. 27). In this graph, the horizontal axis represents frequency, the vertical axis represents transmission path attenuation factor. Note that the transmission path attenuation factor expresses the ratio of signal strength of a reception signal relative to a transmission signal in logarithm (decibel). As the value is closer to 0, the signal is received with less attenuation.

As shown in FIG. 27, according to the configuration in which the AC line 11 and the signal wire 13 are wound around the toroidal core 15a so as to overlap each other, the transmission path attenuation factor is improved, especially in frequencies from 1 MHz to 20 MHz. This is considered to be caused by reduced leak magnetic flux from the coupling transformer 15 as a result of winding the AC line 11 and the signal wire 13 so as to overlap each other.

In the power line communication system according to embodiment 6 having the above configuration, the AC line 11 and the signal wire 13 are wound around the toroidal core 15a so as to overlap each other in the connector device 3. Accordingly, it is possible to improve communication characteristics such as transmission path attenuation characteristics at the time of power line communication, compared with the configuration in which the AC line 11 and the signal wire 13 are wound at different positions on the toroidal core 15a.

Note that, in embodiment 6, description has been given of the connector device 3 having the configuration in which the AC line 11 and the signal wire 13 are wound around the toroidal core 15a so as to overlap each other, in contrast to the connector device 3 according to embodiment 1. However, the present invention is not limited thereto. With respect to the connector devices 3 according to embodiment 2 to 5, the AC line 11 (the AC lines 11 and 12 in the configuration of embodiment 5) and the signal wire 13 may be similarly wound around the toroidal core 15a so as to overlap each other. Accordingly, communication characteristics can be improved.

Since the other configurations of the connector device 3 according to embodiment 6 are similar to those of the connector device 3 according to embodiment 1, similar components are denoted by the same reference numerals and detailed description thereof are omitted.

DESCRIPTION OF THE REFERENCE CHARACTERS 1 electric vehicle (vehicle)
2 body ECU (power line communication device)
3 connector device
11 AC line (one internal power supply wire)
12 AC line (the other internal power supply wire)
13 signal wire
14 grounding wire (internal wire)
15 coupling transformer (electromagnetic guidance type signal converter)
15a toroidal core (annular magnetic body)
16 capacitor (filter circuit)
17 filter circuit
17a coil (electronic component)
17b capacitor (electronic component)
17c wire
18 varistor (protection element)
19 fuse
21 controller
22 power line communication section
30 connector body
31 attachment part
32 tubular part
32a, 32b cutout
33 mounting hole
51, 52 AC line (internal power supply wire)
55 coupling transformer (electromagnetic guidance type signal converter)
55a toroidal core
56 capacitor (filter circuit)
71, 72 AC line (power supply wire)

The invention claimed is:

1. A power line communication system in which a vehicle and a feeding device are connected to each other with a charging cable, and power line communication is performed between a power line communication device installed in the vehicle and the feeding device via the charging cable,
the charging cable comprising two power supply wires,
the power line communication device comprising:
two internal power supply wires respectively connected to the power supply wires of the charging cable;
a filter circuit connected to and between the two internal power supply wires; and
an electromagnetic guidance type signal converter comprising a primary coil provided in one or both of the internal power supply wires, and a secondary coil electromagnetically connected to the primary coil, and
the feeding device comprising:
two internal power supply wires respectively connected to the power supply wires of the charging cable;
a filter circuit connected to and between the two internal power supply wires; and
an electromagnetic guidance type signal converter comprising a primary coil provided in one or both of the internal power supply wires, and a secondary coil electromagnetically connected to the primary coil, wherein
a current loop circuit is formed by the two internal power supply wires and the filter circuit of the power line communication device, the two power supply wires of the charging cable, and the two internal power supply wires and the filter circuit of the feeding device, and
each of the power line communication device and the feeding device is configured to superpose a signal on the charging cable and extract a signal superposed on the charging cable by means of its signal converter.

2. The power communication system according to claim 1, wherein
the power line communication device comprises a connector device which is installed in the vehicle and to which the charging cable is connected,
the connector device has the signal converter integrated therein.

3. The power line communication system according to claim 1, wherein
the power line communication device comprises a connector device which is installed in the vehicle and to which the charging cable is connected,
the connector device comprises:
a plurality of connection terminals for connecting the connector device to the charging cable;
a connector body which houses the plurality of connection terminals;
a plurality of internal wires including the two internal power supply wires and connected to the connection terminals;
a tubular part which is provided in the connector body and through which the plurality of internal wires are inserted;
an annular magnetic body provided externally around the tubular part; and
a signal wire wound around the annular magnetic body, one or both of the internal power supply wires are wound around the annular magnetic body, and
the electromagnetic guidance type signal converter of the power line communication device is formed by the annular magnetic body, the one or both of the internal power supply wires, and the signal wire.

4. The power line communication system according to claim 3, wherein
the signal wire and the one or both of the internal power supply wires are wound around the annular magnetic body so as to overlap each other.

5. A power line communication device in a vehicle which performs power line communication with an external device which is connected to the vehicle with a charging cable,
the charging cable comprising two power supply wires,
the power line communication device comprising:
two internal power supply wires respectively connected to the power supply wires of the charging cable;
a filter circuit connected to and between the two internal power supply wires; and
an electromagnetic guidance type signal converter comprising a primary coil provided in one or both of the internal power supply wires, and a secondary coil electromagnetically connected to the primary coil, wherein
superposition of a signal on the charging cable and extraction of a signal superposed on the charging cable are performed by means of the signal converter.

6. The power line communication device according to claim 5, comprising
a connector device which is installed in the vehicle and to which the charging cable is connected, wherein
the connector device has the signal converter integrated therein.

7. The power line communication device according to claim 5, comprising:
a connector device which is installed in the vehicle and to which the charging cable is connected, wherein
the connector device comprises:
a plurality of connection terminals for connecting the connector device to the charging cable;
a connector body which houses the plurality of connection terminals;
a plurality of internal wires including the two internal power supply wires and connected to the connection terminals;
a tubular part which is provided in the connector body and through which the plurality of internal wires are inserted;
an annular magnetic body provided externally around the tubular part; and
a signal wire wound around the annular magnetic body, one or both of the internal power supply wires are wound around the annular magnetic body, and
the signal converter is formed by the annular magnetic body, the one or both of the internal power supply wires, and the signal wire.

8. The power line communication device according to claim 7, wherein
the signal wire and the one or both of the internal power supply wires are wound around the annular magnetic body so as to overlap each other.

9. A connector device which is used in the power line communication system according to claim 1 and which includes a plurality of connection terminals, a connector body which houses the plurality of connection terminals, and a plurality of internal wires including two internal power supply wires and connected to the connection terminals, the connector device comprising:
an electromagnetic guidance type signal converter comprising a primary coil provided in one or both of the internal power supply wire and a secondary coil electromagnetically connected to the primary coil, wherein
the connector body has the signal converter integrated therein.

10. The connector device according to claim 9, comprising:
a tubular part which is provided in the connector body and through which the plurality of internal wires are inserted;
an annular magnetic body provided externally around the tubular part; and
a signal wire wound around the annular magnetic body, wherein
one or both of the internal power supply wires are wound around the annular magnetic body,
the electromagnetic guidance type signal converter is configured for power line communication performed by the annular magnetic body, the one or both of the internal power supply wires, and the signal wire.

11. The connector device according to claim 10, wherein
the signal wire and the one or both of the internal power supply wires are wound around the annular magnetic body so as to overlap each other.

12. The connector device according to claim 10, wherein
the annular magnetic body is externally fitted on the tubular part, and
a cutout for housing the wound portion of the one or both of the internal power supply wires around the annular magnetic body is formed in the tubular part.

13. The connector device according to claim 12, wherein
the cutout is formed so as to house the signal wire wound around the annular magnetic body as well as the wound portion of the one or both of the internal power supply wires around the annular magnetic body.

14. The connector device according to claim 9, further comprising:
a filter circuit connected to and between the two internal power supply wires.

15. The connector device according to claim 14, wherein
the filter circuit is formed by a plurality of electronic components, and
the plurality of electronic components are connected to each other with a wire provided along the internal power supply wires.

16. The connector device according to claim 9, further comprising:
a surge protection element connected to and between the two internal power supply wires.

17. The connector device according to claim 9, further comprising:
a fuse provided in the internal power supply wires.

18. A connector device which includes a plurality of connection terminals, a connector body which houses the plurality of connection terminals, and a plurality of internal wires including two internal power supply wires and connected to the connection terminals, the connector device comprising:
an annular magnetic body through which one of the internal power supply wires is inserted and the other of the internal power supply wires is not inserted; and
a signal wire wound around the annular magnetic body, wherein
an electromagnetic guidance type signal converter for power line communication is formed by the annular magnetic body, the one of the internal power supply wires, and the signal wire.

* * * * *

UNITED STATES PATENT AND TRADEMARK OFFICE
CERTIFICATE OF CORRECTION

PATENT NO. : 9,174,592 B2
APPLICATION NO. : 13/820693
DATED : November 3, 2015
INVENTOR(S) : Yousuke Takata et al.

Page 1 of 1

It is certified that error appears in the above-identified patent and that said Letters Patent is hereby corrected as shown below:

On the title page

Item (12) "Takaka et al." should read --Takata et al.--.

Item (75) Inventors:

"Yousuke Takaka, Osaka (JP);
Yutaka Komatsu, Osaka (JP);
Takeshi Hagihara, Osaka (JP);
Hiroya Andoh, Toyota (JP);
Yuta Ochiai, Toyota (JP);
Nobuyuki Nakagawa, Toyota (JP);
Yukihiro Miyashita, Toyota (JP)"

should read

--Yousuke Takata, Osaka (JP);
Yutaka Komatsu, Osaka (JP);
Takeshi Hagihara, Osaka (JP);
Hiroya Andoh, Toyota (JP);
Yuta Ochiai, Toyota (JP);
Nobuyuki Nakagawa, Toyota (JP);
Yukihiro Miyashita, Toyota (JP)--

Signed and Sealed this
Fifth Day of July, 2016

Michelle K. Lee
*Director of the United States Patent and Trademark Office*